(12) United States Patent
Shin et al.

(10) Patent No.: US 11,868,176 B2
(45) Date of Patent: Jan. 9, 2024

(54) DISPLAY DEVICE

(71) Applicant: Samsung Display Co., Ltd., Yongin-si (KR)

(72) Inventors: Jaiku Shin, Hwaseong-si (KR); Sung Chul Choi, Hwaseong-si (KR); Sojeong La, Suwon-si (KR); Jin Yong Sim, Seongnam-si (KR); Gyeongho Jeong, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/881,574

(22) Filed: Aug. 4, 2022

(65) Prior Publication Data
US 2023/0099705 A1 Mar. 30, 2023

(30) Foreign Application Priority Data

Sep. 30, 2021 (KR) ........................ 10-2021-0130120

(51) Int. Cl.
G06F 1/16 (2006.01)

(52) U.S. Cl.
CPC .......... *G06F 1/1616* (2013.01); *G06F 1/1652* (2013.01); *G06F 1/1656* (2013.01)

(58) Field of Classification Search
CPC ..... G06F 1/1616; G06F 1/1652; G06F 1/1656
See application file for complete search history.

(56) References Cited

U.S. PATENT DOCUMENTS

| | | | |
|---|---|---|---|
| 10,342,121 B2 | 7/2019 | Koo et al. | |
| 10,838,457 B2* | 11/2020 | Yu | G06F 1/1641 |
| 10,916,719 B2* | 2/2021 | Park | G02F 1/133305 |
| 11,096,293 B2* | 8/2021 | Park | G02F 1/133305 |
| 11,307,613 B2* | 4/2022 | Yu | G06F 1/1616 |
| 11,501,670 B2* | 11/2022 | Kim | G02B 1/11 |
| 11,552,264 B2* | 1/2023 | Kim | H10K 77/111 |
| 11,626,567 B2* | 4/2023 | Kim | H10K 50/80 257/88 |
| 11,662,780 B2* | 5/2023 | Park | G06F 1/1616 361/679.01 |
| 11,726,527 B2* | 8/2023 | Seo | G06F 1/1616 361/679.01 |
| 2021/0041601 A1* | 2/2021 | Oh | G06F 1/1609 |

(Continued)

FOREIGN PATENT DOCUMENTS

| | | |
|---|---|---|
| JP | 6884189 | 6/2021 |
| JP | 6898485 | 7/2021 |
| KR | 10-2019-0049242 | 5/2019 |

*Primary Examiner* — Lisa Lea-Edmonds
(74) *Attorney, Agent, or Firm* — H.C. Park & Associates, PLC

(57) ABSTRACT

A display device includes a display panel foldable with respect to a folding axis substantially parallel to a first direction and a support plate disposed under the display panel and including a folding plate foldable with respect to the folding axis. The folding plate includes at least one first support layer and at least one second support layer. The folding plate has a first elastic modulus corresponding to a bending strength with respect to a second direction intersecting the first direction and a second elastic modulus corresponding to a bending strength with respect to the first direction. The first elastic modulus is smaller than the second elastic modulus.

20 Claims, 30 Drawing Sheets

(56) References Cited

U.S. PATENT DOCUMENTS

| | | | |
|---|---|---|---|
| 2021/0120683 A1* | 4/2021 | Park | B32B 37/12 |
| 2021/0124397 A1 | 4/2021 | Mizoguchi et al. | |
| 2021/0141418 A1* | 5/2021 | Min | G06F 1/1637 |
| 2021/0263563 A1 | 8/2021 | Tsuchihashi et al. | |
| 2022/0035409 A1* | 2/2022 | Heo | G02B 1/04 |
| 2022/0048272 A1* | 2/2022 | Kang | B32B 15/20 |
| 2022/0091689 A1* | 3/2022 | Kishimoto | G06F 1/1643 |
| 2022/0147107 A1* | 5/2022 | Wang | G06F 1/1616 |
| 2022/0199921 A1* | 6/2022 | Kim | H10K 59/40 |
| 2022/0229469 A1* | 7/2022 | Cho | G06F 1/1641 |
| 2022/0261034 A1* | 8/2022 | Lee | G06F 1/1652 |
| 2022/0262282 A1* | 8/2022 | Lee | H10K 50/86 |
| 2022/0404867 A1* | 12/2022 | Shin | G06F 1/1681 |
| 2023/0074833 A1* | 3/2023 | Cho | G06F 1/1616 |

\* cited by examiner

DISPLAY DEVICE

CROSS REFERENCE TO RELATED APPLICATION

This application claims priority from and the benefit of Korean Patent Application No. 10-2021-0130120, filed on Sep. 30, 2021, which is hereby incorporated by reference for all purposes as if fully set forth herein.

BACKGROUND

Field

Embodiments of the invention relate generally to a display device and, more specifically, to a display device including a foldable display panel and a foldable support plate.

Discussion of the Background

A display device includes a display module to display an image and a supporter to support the display module. The display module includes a display panel to display the image, a window disposed on the display panel to protect the display panel from external scratches and impacts, and a protective layer disposed under the display panel to protect the display panel from external impacts. The supporter has a rigidity stronger than that of the display module and supports the display module.

In recent years, with the technological development for the display device, a flexible display device capable of being transformed into various shapes is being developed. The flexible display device includes a flexible display module that is foldable or rollable. The supporter disposed under a portion of the flexible display module, which is folded with respect to a folding axis, is folded with the flexible display module. A technology for easily folding the supporter has been demanded.

The above information disclosed in this Background section is only for understanding of the background of the inventive concepts, and, therefore, it may contain information that does not constitute prior art.

SUMMARY

Display devices constructed according to the principles and illustrative embodiments of the invention are capable of performing reliable folding operations and smooth/easy folding operations by providing a support plate having a folding plate having different elastic moduli.

Additional features of the inventive concepts will be set forth in the description which follows, and in part will be apparent from the description, or may be learned by practice of the inventive concepts.

According to an aspect of the invention, a display device includes a display panel foldable with respect to a folding axis substantially parallel to a first direction and a support plate disposed under the display panel and including a folding plate foldable with respect to the folding axis. The folding plate includes at least one first support layer and at least one second support layer. The folding plate has a first elastic modulus corresponding to a bending strength with respect to a second direction intersecting the first direction and a second elastic modulus corresponding to a bending strength with respect to the first direction. The first elastic modulus is smaller than the second elastic modulus.

A number of the first support layers may be greater than a number of the second support layers.

The at least one first support layer may be provided in plural, and wherein: one of the first support layers may form an upper surface of the support plate facing the display panel, another of the first support layers may form a lower surface of the support plate opposite to the upper surface, and the at least one second support layer may be disposed between the first support layers.

Each of the first support layers may include a plurality of first fibers extending in the first direction and arranged in the second direction, and the second support layer may include a plurality of second fibers extending in the second direction and arranged in the first direction.

Each of the first support layers may have a same thickness as a thickness of the second support layer with respect to a direction substantially perpendicular to the upper surface of the support plate.

Each of the first support layers may have a thickness different from a thickness of the second support layer with respect to a direction substantially perpendicular to the upper surface of the support plate.

The thickness of each of the first support layers may be smaller than the thickness of the second support layer.

The second support layer may include a material different from a material of the first support layers.

Each of the first support layers may include a plurality of first fibers extending in the first direction and arranged in the second direction, and the second support layer may include a metal material.

Each of the first support layers may include a metal material, and the second support layer may include a plurality of first fibers extending in the first direction and arranged in the second direction.

The display panel may include a first non-folding area, a folding area, and a second non-folding area sequentially arranged in the second direction, and the support plate further may include a first support plate disposed in the first non-folding area and a second support plate disposed in the second non-folding area, and wherein the folding plate may be disposed in the folding area.

The folding plate may include a plurality of first openings, each of the first openings extending in the first direction, wherein the first openings may include: a plurality of first sub-openings arranged in the first direction; and a plurality of second sub-openings adjacent to the first openings in the second direction and arranged in the first direction, and wherein the first sub-openings may be interlaced with the second sub-openings.

The folding plate may include: a first reverse curvature portion adjacent to the first support plate; a second reverse curvature portion adjacent to the second support plate; and a curved portion disposed between the first reverse curvature portion and the second reverse curvature portion and including the first openings, and wherein: the first and second reverse curvature portions may be curved in a direction opposite to the curved portion, and each of the first and second reverse curvature portions may include a plurality of second openings arranged in a regular pattern.

Each of the second openings may have a circular shape with a diameter from about 100 micrometers to about 1 millimeters.

The second openings may be formed at a porosity from about 30% to about 70% in each of the first and second reverse curvature portions.

According to another aspect of the invention, a display device includes a display panel foldable with respect to a folding axis substantially parallel to a first direction and a support plate disposed under the display panel and including a first support plate, a folding plate, and a second support plate arranged in a second direction intersecting the first direction. The folding plate is foldable with respect to the folding axis, and the folding plate includes a first reverse curvature portion adjacent to the first support plate, a second reverse curvature portion adjacent to the second support plate, and a curved portion disposed between the first and second reverse curvature portions and including a plurality of first openings. The first openings extend in the first direction, each of the first and second reverse curvature portions includes a plurality of second openings, and each of the second openings having a circular shape.

The second openings may be arranged in a regular pattern in each of the first and second reverse curvature portions.

Each of the second openings may have a diameter from about 100 micrometers to about 1 millimeters and may be formed at a porosity from about 30% to about 70% in each of the first and second reverse curvature portions.

The folding plate may include: a plurality of first support layers each comprising a plurality of first fibers extending in the first direction and arranged in the second direction; and a second support layer disposed between the first support layers and comprising a plurality of second fibers extending in the second direction and arranged in the first direction.

According to another aspect of the invention, an electronic device includes a display device including a first hole area through which an optical signal transmits, an electro-optical module disposed under the display device, the electro-optical module overlapping the first hole area and receiving the optical signal, and a case accommodating the display device and the electro-optical module. The display device includes a display panel foldable with respect to a folding axis substantially parallel to a first direction and a support plate disposed under the display panel and including a folding plate foldable with respect to the folding axis. The folding plate includes at least one first support layer and at least one second support layer. The folding plate has a first elastic modulus corresponding to a bending strength with respect to a second direction intersecting the first direction and a second elastic modulus corresponding to a bending strength with respect to the first direction. The first elastic modulus is smaller than the second elastic modulus.

According to the above, when the display device is foldable about the folding axis substantially parallel to the first direction, the folding plate of the support plate has the first elastic modulus corresponding to the bending strength with respect to the second direction and the second elastic modulus corresponding to the bending strength with respect to the first direction. The elastic modulus of the folding plate is formed such that the first elastic modulus is smaller than the second elastic modulus, and thus, the folding plate is more easily foldable about the folding axis parallel to the first direction.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

DETAILED DESCRIPTION

Figure 1:
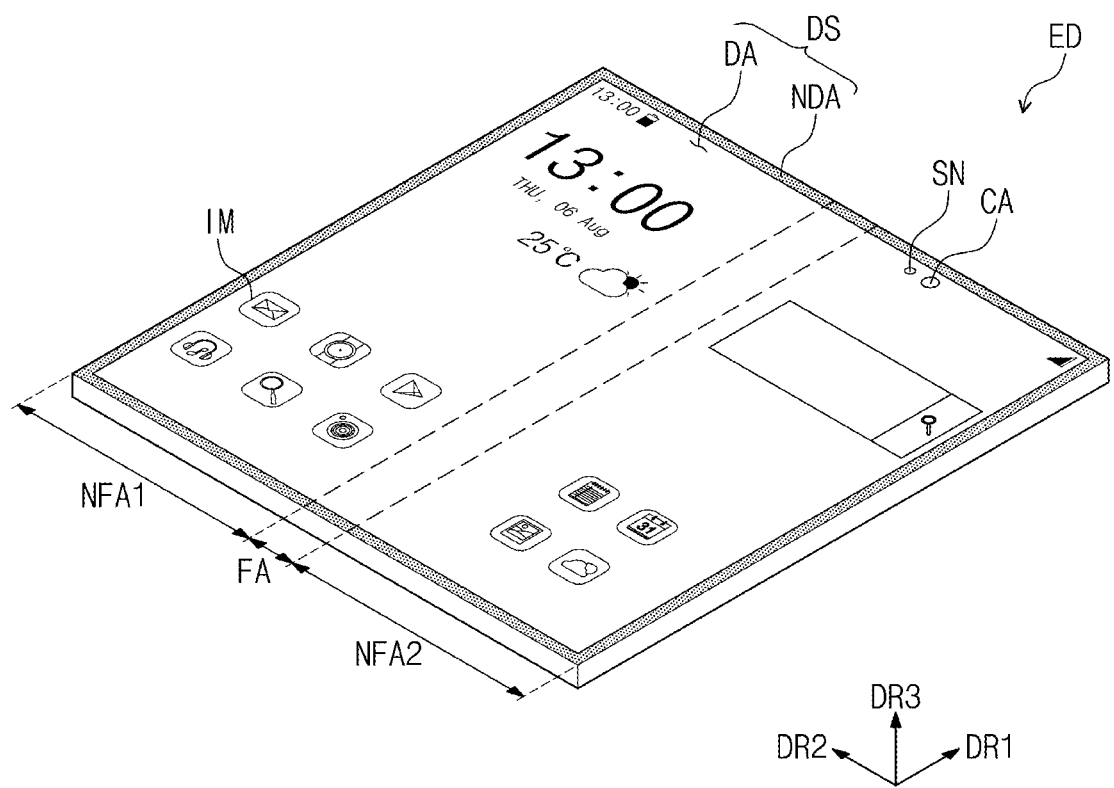
FIG. 1 is a perspective view of an embodiment of an electronic device constructed according to the principles of the invention.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the DR1-axis, the DR2-axis, and the DR3-axis are not limited to three axes of a rectangular coordinate system, such as the x, y, and z-axes, and may be interpreted in a broader sense. For example, the DR1-axis, the DR2-axis, and the DR3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, embodiments will be described in detail with reference to the accompanying drawings.

Figure 2:
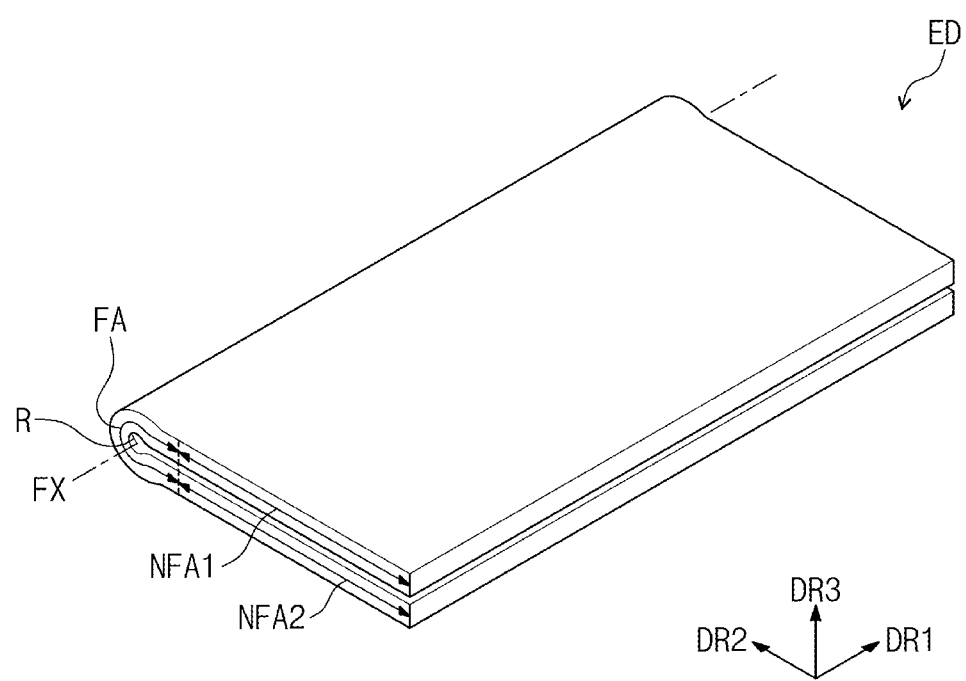
FIG. 2 is a perspective view of a folded state of the electronic device of FIG. 1.

FIG. 1 is a perspective view of an electronic device ED according to an embodiment, and FIG. 2 is a perspective view of a folded state of the electronic device ED of FIG. 1.

Referring to FIG. 1, the electronic device ED may have a rectangular shape defined by long sides extending in a first direction DR1 and short sides extending in a second direction DR2 intersecting the first direction DR1. However, the shape of the electronic device ED should not be limited to the rectangular shape, and the electronic device ED may have various shapes, such as a circular shape and a polygonal shape. The electronic device ED may be a flexible display device.

Hereinafter, a direction substantially perpendicular to a plane defined by the first direction DR1 and the second direction DR2 may be referred to as a third direction DR3. In the descriptions, the expression "when viewed in a plane" may mean a state of being viewed in the third direction DR3.

The electronic device ED may include a folding area FA and a plurality of non-folding areas NFA1 and NFA2. The non-folding areas NFA1 and NFA2 may include a first non-folding area NFA1 and a second non-folding area NFA2. The folding area FA may be disposed between the first non-folding area NFA1 and the second non-folding area NFA2. The second non-folding area NFA2, the folding area FA, and the first non-folding area NFA1 may be arranged in the second direction DR2.

In an embodiment, one folding area FA and two non-folding areas NFA1 and NFA2 are shown as a representative example. However, the number of the folding areas FA and the number of non-folding areas NFA1 and NFA2 should not be limited thereto or thereby. For example, the electronic device ED may include more than two non-folding areas and a plurality of folding areas disposed between the non-folding areas.

An upper surface of the electronic device ED may be referred to as a display surface DS, and the display surface DS may be a plane defined by the first direction DR1 and the second direction DR2. Images IM generated by the electronic device ED may be provided to a user through the display surface DS.

The display surface DS may include a display area DA and a non-display area NDA around the display area DA. The display area DA may display the image, and the non-display area NDA may not display the image. The non-display area NDA may surround the display area DA and may define an edge of the electronic device ED, which is printed by a predetermined color.

The electronic device ED may include at least one sensor SN and at least one camera CA. The sensor SN and the camera CA may be disposed adjacent to the edge of the electronic device ED. The sensor SN and the camera CA may be disposed in the display area DA adjacent to the non-display area NDA. The sensor SN and the camera CA may be disposed in the second non-folding area NFA2.

However, according to an embodiment, the sensor SN and the camera CA may be disposed in the first non-folding area NFA1.

A light may be provided to the camera CA and the sensor SN after passing through portions of the electronic device ED on which the sensor SN and the camera CA are disposed. As an example, the sensor SN may include a proximity illumination sensor. However, the sensor SN should not be particularly limited thereto. The camera CA may take a picture of external objects. Each of the sensor SN and the camera CA may be provided in plural.

Referring to FIG. 2, the electronic device ED may be a foldable electronic device ED that is folded or unfolded. The folding area FA may be folded with respect to a folding axis FX substantially parallel to the first direction DR1, and thus, the electronic device ED may be folded. The folding axis FX may be defined as a major axis substantially parallel to the long sides of the electronic device ED.

When the electronic device ED is folded, the first non-folding area NFA1 and the second non-folding area NFA2 may face each other, and thus, the electronic device ED may be inwardly folded (e.g., in-folding) such that the display surface DS may not be exposed to the outside. However, embodiments are not limited thereto or thereby. As an example, the electronic device ED may be outwardly folded (e.g., out-folding) with respect to the folding axis FX such that the display surface DS may be exposed to the outside.

A distance between the first non-folding area NFA1 and the second non-folding area NFA2 may be smaller than a radius of curvature R. Accordingly, the folding area FA may be folded to have a dumbbell shape when viewed in the first direction DR1. For example, the electronic device ED is folded, the thickness of the folding area FA may be greater than those of the first non-folding area NFA1 and the second non-folding area NFA2 in the third direction DR3.

Figure 3:
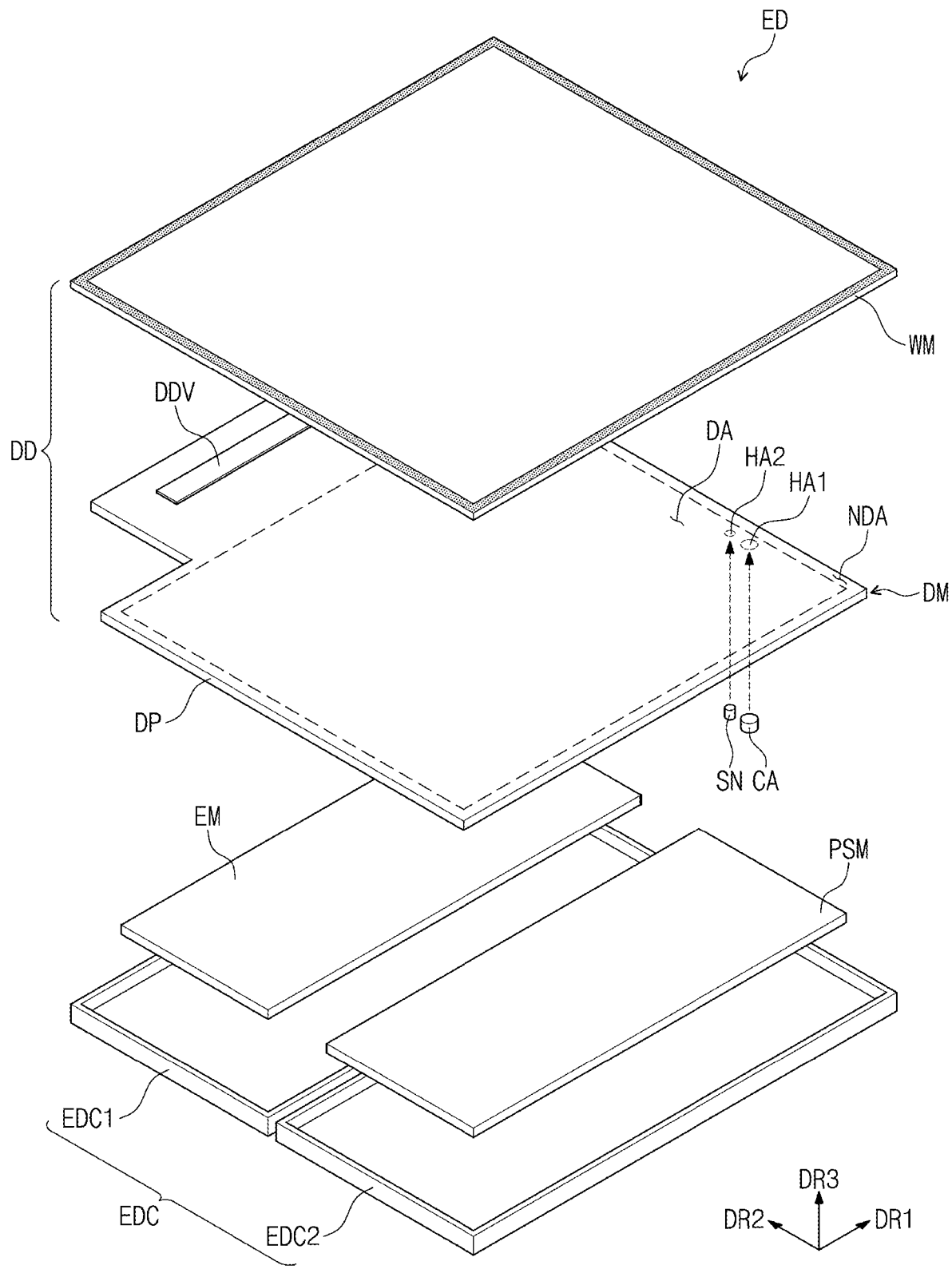
FIG. 3 is an exploded perspective view of the electronic device of FIG. 1.

FIG. 3 is an exploded perspective view of the electronic device ED of FIG. 1.

Referring to FIG. 3, the electronic device ED may include a display device DD, the camera CA, the sensor SN, an electronic module EM, a power module PSM, and a case EDC. The electronic device ED may further include a mechanical structure, e.g., a hinge structure, to control a folding operation of the display device DD.

The display device DD may generate an image and may sense an external input. The display device DD may include a window module WM and a display module DM. The window module WM may provide a front surface of the electronic device ED. The window module WM may be disposed on the display module DM and may protect the display module DM. The window module WM may transmit a light generated by the display module DM to provide the light to a user.

The display module DM may include a display panel DP. FIG. 3 shows only the display panel DP among components of the display module DM. However, the display module DM may further include a plurality of components disposed on and under the display panel DP. The detailed stack structure of the display module DM will be described later. The display panel DP may include a display area DA and a non-display area NDA, which respectively correspond to the display area DA (refer to FIG. 1) and the non-display area NDA (refer to FIG. 1) of the electronic device ED.

The display panel DP may have a first hole area HA1 and a second hole area HA2, which pass through the display panel DP. The first hole area HA1 and the second hole area HA2 may have a light transmittance higher than other areas adjacent to the first hole area HA1 and the second hole area HA2. The camera CA may be disposed under the first hole area HA1, and the sensor SN may be disposed under the second hole area HA2. The light may be provided to the camera CA and the sensor SN after passing through the first hole area HA1 and the second hole area HA2.

The display module DM may include a data driver DDV disposed in the non-display area NDA of the display panel DP. The data driver DDV may be formed in an integrated circuit chip form and may be mounted on the non-display area NDA. However, embodiments are not limited thereto or thereby. According to an embodiment, the data driver DDV may be mounted on a flexible circuit board connected to the display panel DP.

The electronic module EM and the power module PSM may be disposed under the display device DD. For example, the electronic module EM and the power module PSM may be connected to each other via a separate flexible circuit board. The electronic module EM may control an operation of the display device DD. The power module PSM may supply a power to the electronic module EM.

The case EDC may accommodate the display device DD, the electronic module EM, and the power module PSM. The case EDC may include two cases, e.g., first and second cases EDC1 and EDC2, to fold the display device DD. The first and second cases EDC1 and EDC2 may extend in the first direction DR1 and may be arranged in the second direction DR2.

For example, the electronic device ED may further include a hinge structure to connect the first and second cases EDC1 and EDC2. The case EDC may be coupled to the window module WM. The case EDC may protect the display device DD, the electronic module EM, and the power module PSM.

Figure 4:
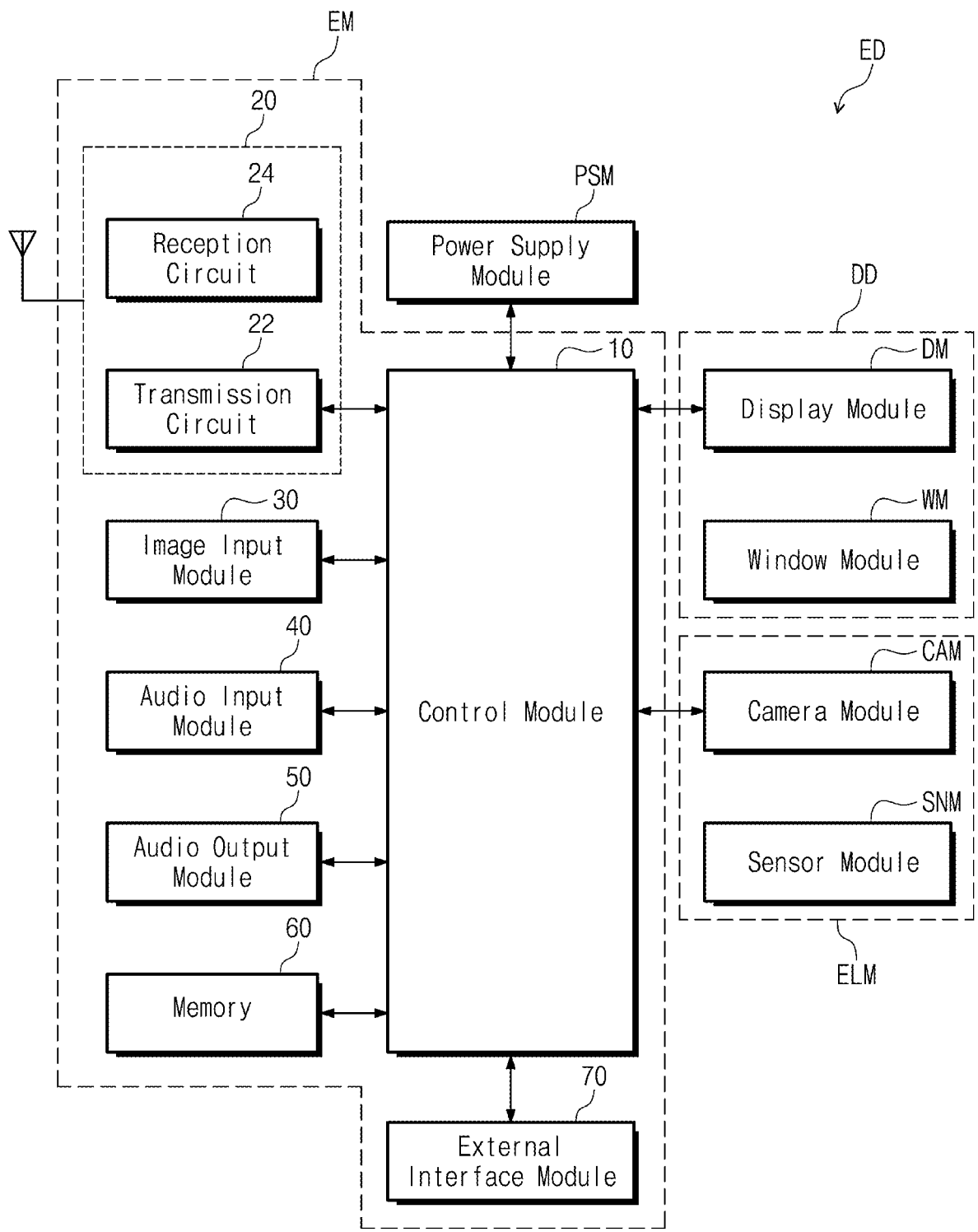
FIG. 4 is a block diagram of the electronic device of FIG. 3.

FIG. 4 is a block diagram of the electronic device ED of FIG. 3.

Referring to FIG. 4, the electronic device ED may include the electronic module EM, the power module PSM, the display device DD, and an electro-optical module ELM. The electronic module EM may include a control module 10, a wireless communication module 20, an image input module 30, an audio input module 40, an audio output module 50, a memory 60, and an external interface module 70. The modules 10, 20, 30, 40, 50, 60, and 70 may be mounted on a circuit board to be electrically connected to each other or may be electrically connected to each other through a flexible circuit board. The electronic module EM may be electrically connected to the power supply module PSM.

The control module 10 may control an overall operation of the electronic device ED. For example, the control module 10 may activate or deactivate the display device DD in response to the user's input. The control module 10 may control other modules, such as the image input module 30, the audio input module 40, the audio output module 50, or the like, in response to the user's input. The control module 10 may include at least one microprocessor.

The wireless communication module 20 may transmit/receive a wireless signal to/from other terminals using a Bluetooth or WiFi link. The wireless communication module 20 may transmit/receive a voice signal using a general communication line. The wireless communication module 20 may include a transmission circuit 22 that modulates a signal to be transmitted and transmits the modulated signal and a reception circuit 24 that demodulates the signal applied thereto.

The image input module 30 may process an image signal and may convert the image signal into image data that may be displayed through the display device DD. The audio input module 40 may receive an external sound signal through a microphone in a record mode or a voice recognition mode and may convert the external sound signal to electrical voice data. The audio output module 50 may convert sound data provided thereto from the wireless communication module 20 or sound data stored in the memory 60 and may output the converted sound data.

The external interface module 70 may function as an interface between the control module 10 and external devices, such as an external charger, a wired/wireless data port, a card socket (e.g., a memory card and a SIM/UIM card), etc.

The power supply module PSM may supply a power required for the overall operation of the electronic device ED. The power supply module PSM may include a conventional battery device.

The electro-optical module ELM may be an electronic component that transmits or receives the optical signal. The electro-optical module ELM may transmit or receive the optical signal through a partial area of the display device DD. In an embodiment, the electro-optical module ELM may include a camera module CAM and a sensor module SNM. The camera module CAM may include the camera CA of FIG. 3. The sensor module SNM may include the sensor SN of FIG. 3.

Figure 5:
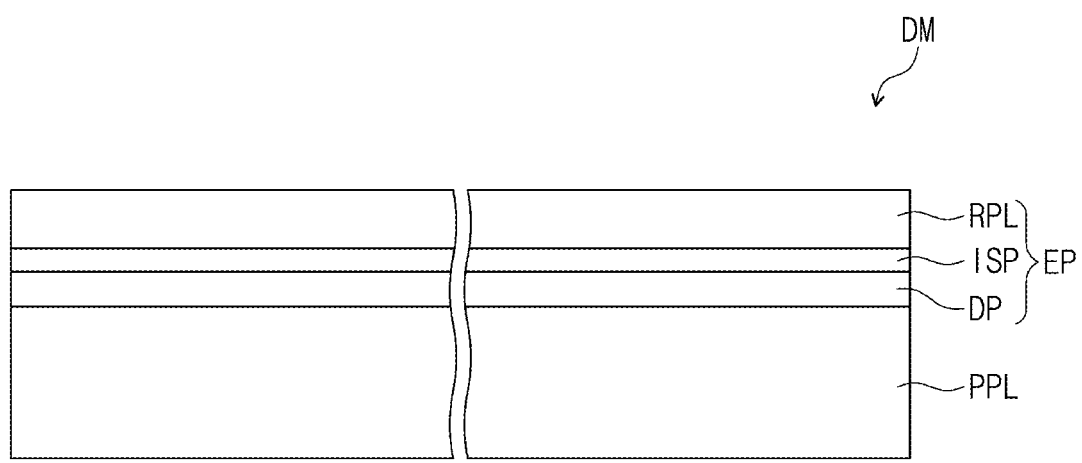
FIG. 5 is a cross-sectional view of a display module of FIG. 3.
Figure 5:
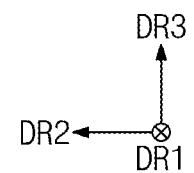

FIG. 5 is a cross-sectional view of the display module DM of FIG. 3.

Referring to FIG. 5, the display module DM may include an electronic panel EP and a panel protective layer PPL disposed under the electronic panel EP. The electronic panel EP may include the display panel DP, an input sensing part ISP disposed on the display panel DP, and an anti-reflective layer RPL disposed on the input sensing part ISP. The display panel DP may be a flexible display panel. As an example, the display panel DP may include a flexible substrate and a plurality of elements disposed on the flexible substrate.

According to an embodiment, the display panel DP may be a light emitting type display panel. However, embodiments are not limited thereto or thereby. As an example, the display panel DP may be an organic light emitting display panel or an inorganic light emitting display panel. A light emitting layer of the organic light emitting display panel may include an organic light emitting material. A light emitting layer of the inorganic light emitting display panel may include a quantum dot or a quantum rod. Hereinafter, the organic light emitting display panel will be described as a representative example of the display panel DP.

The input sensing part ISP may include a plurality of sensors to sense an external input by a capacitive method. The input sensing part ISP may be directly formed on the display panel DP when the display module DM is formed.

The anti-reflective layer RPL may be disposed on the input sensing part ISP. The anti-reflective layer RPL may be directly formed on the input sensing part ISP when the display module DM is formed. The anti-reflective layer RPL may be defined as an external light reflection prevention film. The anti-reflective layer RPL may decrease a reflectance of an external light incident to the display panel DP from the above of the display device DD.

As an example, the input sensing part ISP may be disposed directly on the display panel DP, and the anti-reflective layer RPL may be directly formed on the input sensing part ISP. However, embodiments are not limited thereto or thereby. As an example, the input sensing part ISP may be attached to the display panel DP by an adhesive layer after being formed separately from the display panel DP, and the anti-reflective layer RPL may be attached to the input sensing part ISP by an adhesive layer after being formed separately.

The panel protective layer PPL may be disposed under the display panel DP. The panel protective layer PPL may protect a lower portion of the display panel DP. The panel protective layer PPL may include a flexible plastic material. As an example, the panel protective layer PPL may include polyethylene terephthalate (PET).

Figure 6:
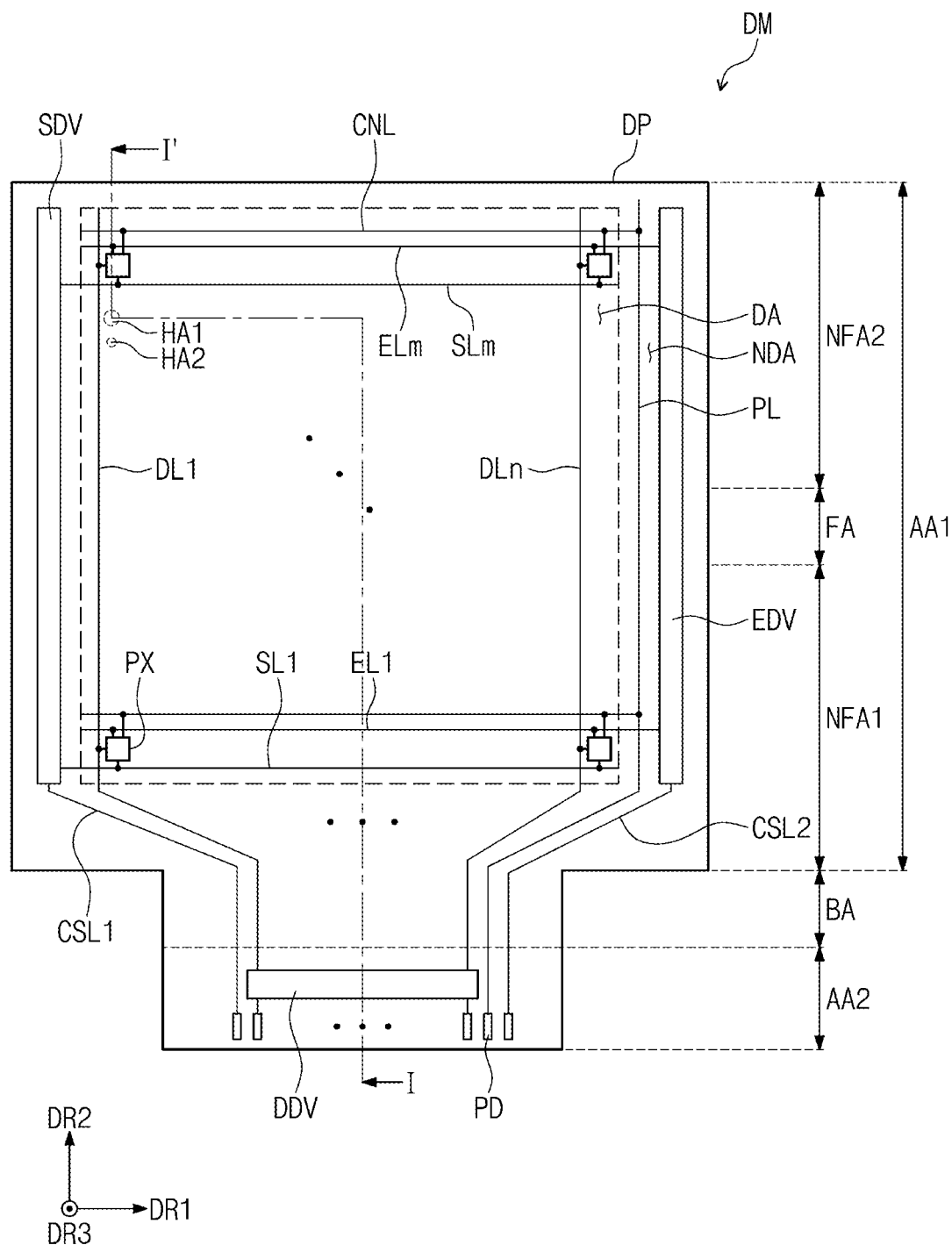
FIG. 6 is a plan view of a display panel of FIG. 3.

FIG. 6 is a plan view of the display module DM of FIG. 3.

Referring to FIG. 6, the display module DM may include the display panel DP, a scan driver SDV, a data driver DDV, and an emission driver EDV.

The display panel DP may include a first area AA1, a second area AA2, and a bending area BA between the first area AA1 and the second area AA2. The bending area BA may extend in the first direction DR1, and the first area AA1, the bending area BA, and the second area AA2 may be arranged in the second direction DR2.

The first area AA1 may include the display area DA and the non-display area NDA around the display area DA. The non-display area NDA may surround the display area DA. The display area DA may be an area in which the image is displayed, and the non-display area NDA may be an area in which the image is not displayed. The second area AA2 and the bending area BA may be areas in which the image is not displayed.

When viewed in the first direction DR1, the first area AA1 may include the first non-folding area NFA1, the second non-folding area NFA2, and the folding area FA between the first non-folding area NFA1 and the second non-folding area NFA2. As the folding area FA is folded with respect to the folding axis FX, the display panel DP may be folded. The first and second hole areas HA1 and HA2 may be defined in the display area DA and the second non-folding area NFA2.

The display panel DP may include a plurality of pixels PX, a plurality of scan lines SL1 to SLm, a plurality of data lines DL1 to DLn, a plurality of emission lines EL1 to ELm, first and second control lines CSL1 and CSL2, a power line PL, a plurality of connection lines CNL, and a plurality of pads PD. Each of m and n is a natural number. The pixels PX may be arranged in the display area DA and may be connected to the scan lines SL1 to SLm, the data lines DL1 to DLn, and the emission control lines ECL1 to ECLm.

The scan driver SDV and the emission driver EDV may be disposed in the non-display area NDA. The scan driver SDV and the emission driver EDV may be disposed in the non-display area NDA to be respectively adjacent to both sides of the first area AA1, which are opposite to each other in the first direction DR1. The data driver DDV may be disposed in the second area AA2. The data driver DDV may be formed in an integrated circuit chip form and may be mounted on the second area AA2.

The scan lines SL1 to SLm may extend in the first direction DR1 and may be connected to the scan driver SDV. The data lines DL1 to DLn may extend in the second direction DR2 and may be connected to the data driver DDV via the bending area BA. The emission lines EL1 to ELm may extend in the first direction DR1 and may be connected to the emission driver EDV.

The power line PL may extend in the second direction DR2 and may be disposed in the non-display area NDA. The power line PL may be disposed between the display area DA and the emission driver EDV. However, embodiments are not limited thereto or thereby. For example, the power line PL may be disposed between the display area DA and the scan driver SDV.

The power line PL may extend to the second area AA2 via the bending area BA. When viewed in a plane, the power line PL may extend to a lower end of the second area AA2. The power line PL may receive a driving voltage.

The connection lines CNL may extend in the first direction DR1 and may be arranged in the second direction DR2. The connection lines CNL may be connected to the power line PL and the pixels PX. The driving voltage may be applied to the pixels PX via the power line PL and the connection lines CNL connected to the power line PL.

The first control line CSL1 may be connected to the scan driver SDV and may extend toward the lower end of the second area AA2 via the bending area BA. The second control line CSL2 may be connected to the emission driver EDV and may extend toward the lower end of the second area AA2 via the bending area BA. The data driver DDV may be disposed between the first control line CSL1 and the second control line CSL2.

When viewed in a plane, the pads PD may be disposed adjacent to the lower end of the second area AA2. The data driver DDV, the power line PL, the first control line CSL1, and the second control line CSL2 may be connected to the pads PD.

The data lines DL1 to DLn may be connected to corresponding pads PD via the data driver DDV. As an example, the data lines DL1 to DLn may be connected to the data driver DDV, and the data driver DDV may be connected to the pads PD1 corresponding to the data lines DL1 to DLn.

For example, a printed circuit board may be connected to the pads PD, and a timing controller and a voltage generator may be disposed on the printed circuit board. The timing controller may be formed in an integrated circuit chip form and may be mounted on the printed circuit board. The timing controller and the voltage generator may be connected to the pads PD via the printed circuit board.

The timing controller may control an operation of the scan driver SDV, the data driver DDV, and the emission driver EDV. The timing controller may generate a scan control signal, a data control signal, and an emission control signal in response to control signals applied thereto from the outside. The voltage generator may generate the driving voltage.

The scan control signal may be applied to the scan driver SDV via the first control line CSL1. The emission control signal may be applied to the emission driver EDV via the second control line CSL2. The data control signal may be applied to the data driver DDV. The timing controller may receive image signals from the outside, may convert a data format of the image signals to a data format appropriate to an interface between the timing controller and the data driver DDV, and may provide the converted image signals to the data driver DDV.

The scan driver SDV may generate a plurality of scan signals in response to the scan control signal. The scan signals may be applied to the pixels PX via the scan lines SL1 to SLm. The scan signals may be sequentially applied to the pixels PX.

The data driver DDV may generate a plurality of data voltages corresponding to the image signals in response to the data control signal. The data voltages may be applied to the pixels PX via the data lines DL1 to DLn. The emission driver EDV may generate a plurality of emission signals in response to the emission control signal. The emission signals may be applied to the pixels PX via the emission lines EL1 to ELm.

The pixels PX may receive the data voltages in response to the scan signals. The pixels PX may emit a light having a luminance corresponding to the data voltages in response to the emission signals, and thus, the image may be displayed. An emission time of the pixels PX may be controlled by the emission signals.

Figure 7:
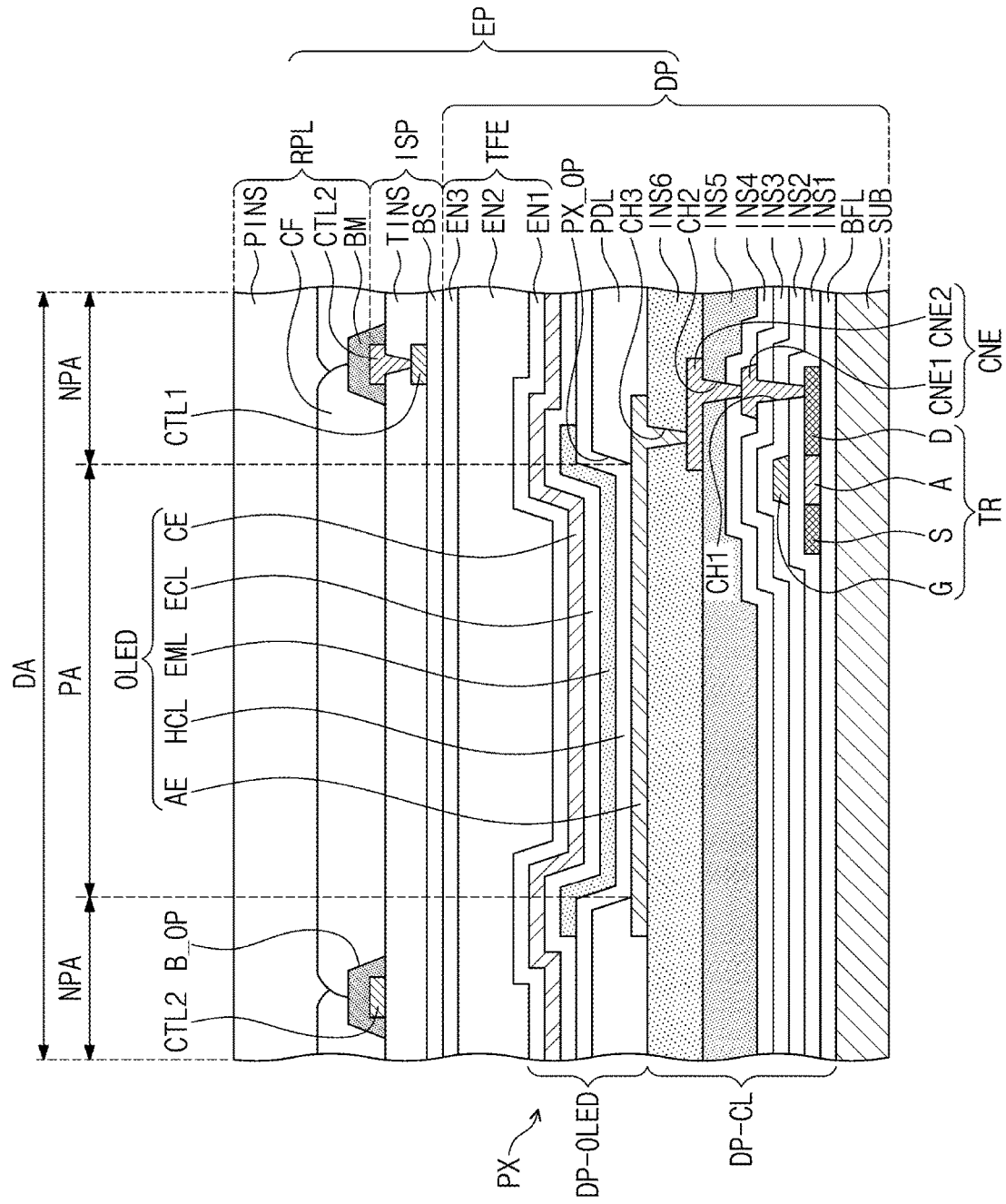
FIG. 7 is a cross-sectional view of an electronic panel corresponding to a pixel of FIG. 6.

FIG. 7 is a cross-sectional view of the electronic panel corresponding to the pixel of FIG. 6.

Referring to FIG. 7, the pixel PX may include a transistor TR and a light emitting element OLED. The light emitting element OLED may include a first electrode (e.g., an anode) AE, a second electrode (e.g., a cathode) CE, a hole control layer HCL, an electron control layer ECL, and a light emitting layer EML.

The transistor TR and the light emitting element OLED may be disposed on a substrate SUB. As an example, one transistor TR is of FIG. 7. However, the pixel PX may include a plurality of transistors and at least one capacitor to drive the light emitting element OLED.

The display area DA may include a light emitting area PA corresponding to each pixel PX and a non-light-emitting area NPA around the light emitting area PA. The light emitting element OLED may be disposed in the light emitting area PA.

A buffer layer BFL may be disposed on the substrate SUB, and the buffer layer BFL may be an inorganic layer. A semiconductor pattern may be disposed on the buffer layer BFL. The semiconductor pattern may include polycrystalline silicon, amorphous silicon, or metal oxide.

The semiconductor pattern may be doped with an N-type dopant or a P-type dopant. The semiconductor pattern may include a high-doped region and a low-doped region. The high-doped region may have a conductivity greater than that of the low-doped region and may substantially function as a source and a drain of the transistor TR. The low-doped region may substantially correspond to an active (e.g., a channel) of the transistor TR.

The source S, the active A, and the drain D of the transistor TR may be formed from the semiconductor pattern. A first insulating layer INS1 may be disposed on the semiconductor pattern. A gate G of the transistor TR may be disposed on the first insulating layer INS1. A second insulating layer INS2 may be disposed on the gate G. A third insulating layer INS3 may be disposed on the second insulating layer INS2.

A connection electrode CNE may include a first connection electrode CNE1 and a second connection electrode CNE2 to connect the transistor TR to the light emitting element OLED. The first connection electrode CNE1 may be disposed on the third insulating layer INS3 and may be connected to the drain D via a first contact hole CH1 defined in (or formed by passing through) the first, second, and third insulating layers INS1, INS2, and INS3.

A fourth insulating layer INS4 may be disposed on the first connection electrode CNE1. A fifth insulating layer INS5 may be disposed on the fourth insulating layer INS4. The second connection electrode CNE2 may be disposed on the fifth insulating layer INS5. The second connection electrode CNE2 may be connected to the first connection electrode CNE1 via a second contact hole CH2 defined in (or formed by passing through) the fourth insulating layer INS4 and the fifth insulating layer INS5.

A sixth insulating layer INS6 may be disposed on the second connection electrode CNE2. Each layer from the buffer layer BFL to the sixth insulating layer INS6 may be defined as a circuit element layer DP-CL. Each of the first to sixth insulating layers INS1 to INS6 may be an inorganic layer or an organic layer.

The first electrode AE may be disposed on the sixth insulating layer INS6. The first electrode AE may be connected to the second connection electrode CNE2 via a third contact hole CH3 defined in (or formed by passing through) the sixth insulating layer INS6. A pixel definition layer PDL may be disposed on the first electrode AE and the sixth insulating layer INS6. The pixel definition layer PDL may be provided with an opening PX_OP defined therethrough to expose a portion of the first electrode AE.

The hole control layer HCL may be disposed on the first electrode AE and the pixel definition layer PDL. The hole control layer HCL may include a hole transport layer and a hole injection layer.

The light emitting layer EML may be disposed on the hole control layer HCL. The light emitting layer EML may be disposed in an area corresponding to the opening PX_OP. The light emitting layer EML may include an organic material and/or an inorganic material. The light emitting layer EML may generate a light having one of red, green, and blue colors.

The electron control layer ECL may be disposed on the light emitting layer EML and the hole control layer HCL. The electron control layer ECL may include an electron transport layer and an electron injection layer. The hole control layer HCL and the electron control layer ECL may be commonly disposed in the light emitting area PA and the non-light-emitting area NPA.

The second electrode CE may be disposed on the electron control layer ECL. The second electrode CE may be commonly disposed over the pixels PX. A layer on which the light emitting element OLED is disposed may be referred to as a display element layer DP-OLED.

A thin film encapsulation layer TFE may be disposed on the second electrode CE to cover the pixel PX. The thin film encapsulation layer TFE may include a first encapsulation layer EN1 disposed on the second electrode CE, a second encapsulation layer EN2 disposed on the first encapsulation layer EN1, and a third encapsulation layer EN3 disposed on the second encapsulation layer EN2.

The first and third encapsulation layers EN1 and EN3 may include an inorganic insulating layer and may protect the pixel PX from moisture and oxygen. The second encapsulation layer EN2 may include an organic insulating layer and may protect the pixel PX from a foreign substance such as dust particles.

A first voltage may be applied to the first electrode AE via the transistor TR, and a second voltage having a voltage level lower than that of the first voltage may be applied to the second electrode CE. Holes and electrons injected into the light emitting layer EML may be recombined to generate excitons, and the light emitting element OLED may emit the light by the excitons that return to a ground state from an excited state.

The input sensing part ISP may be disposed on the thin film encapsulation layer TFE. The input sensing part ISP may be directly formed on an upper surface of the thin film encapsulation layer TFE.

A base layer BS may be disposed on the thin film encapsulation layer TFE. The base layer BS may include an inorganic insulating layer. At least one inorganic insulating layer may be provided on the thin film encapsulation layer TFE as the base layer BS.

The input sensing part ISP may include a first conductive pattern CTL1 and a second conductive pattern CTL2 disposed on the first conductive pattern CTL1. The first conductive pattern CTL1 may be disposed on the base layer BS. An insulating layer TINS may be disposed on the base layer BS to cover the first conductive pattern CTL1. The insulating layer TINS may include an inorganic insulating layer or an organic insulating layer. The second conductive pattern CTL2 may be disposed on the insulating layer TINS.

The first and second conductive patterns CTL1 and CTL2 may overlap the non-light-emitting area NPA. For example, the first and second conductive patterns CTL1 and CTL2 may be disposed in the non-light-emitting area NPA between the light emitting areas PA and may have a mesh shape.

The first and second conductive patterns CTL1 and CTL2 may form the sensors of the input sensing part ISP. As an example, the first and second conductive patterns CTL1 and CTL2 having the mesh shape may be separated from each other in a predetermined area to form the sensors. A portion of the second conductive pattern CTL2 may be connected to the first conductive pattern CTL1.

The anti-reflective layer RPL may be disposed on the second conductive pattern CTL2. The anti-reflective layer RPL may include a black matrix BM and a plurality of color filters CF. The black matrix BM may overlap the non-light-emitting area NPA, and the color filters CF may overlap the light emitting areas PA, respectively.

The black matrix BM may be disposed on the insulating layer TINS to cover the second conductive pattern CTL2. The black matrix BM may be provided with an opening B_OP defined therethrough to overlap the light emitting area PA and the opening PX_OP. The black matrix BM may absorb and block the light. A width of the opening B_OP may be greater than a width of the opening PX_OP.

The color filters CF may be disposed on the insulating layer TINS and the black matrix BM. The color filters CF may be disposed in the openings B_OP, respectively. A planarization insulating layer PINS may be disposed on the color filters CF. The planarization insulating layer PINS may provide a flat upper surface.

In a case where the external light incident to the display panel DP is provided to the user after being reflected by the display panel DP, like a mirror, the user may perceive or recognize the external light. The anti-reflective layer RPL may include the color filters CF that display the same colors as those of the pixels to prevent the above-mentioned phenomenon (e.g., reflection of the external light). The color filters may filter the external light to have the same color as the pixels. In this case, the external light may not be perceived or recognized by the user.

However, embodiments are not limited thereto or thereby, and the anti-reflective layer RPL may include a polarizing film to reduce the reflectance of the external light. The polarizing film may be attached to the input sensing part ISP by an adhesive layer after being formed separately. The polarizing film may include a retarder and/or a polarizer.

Figure 8:
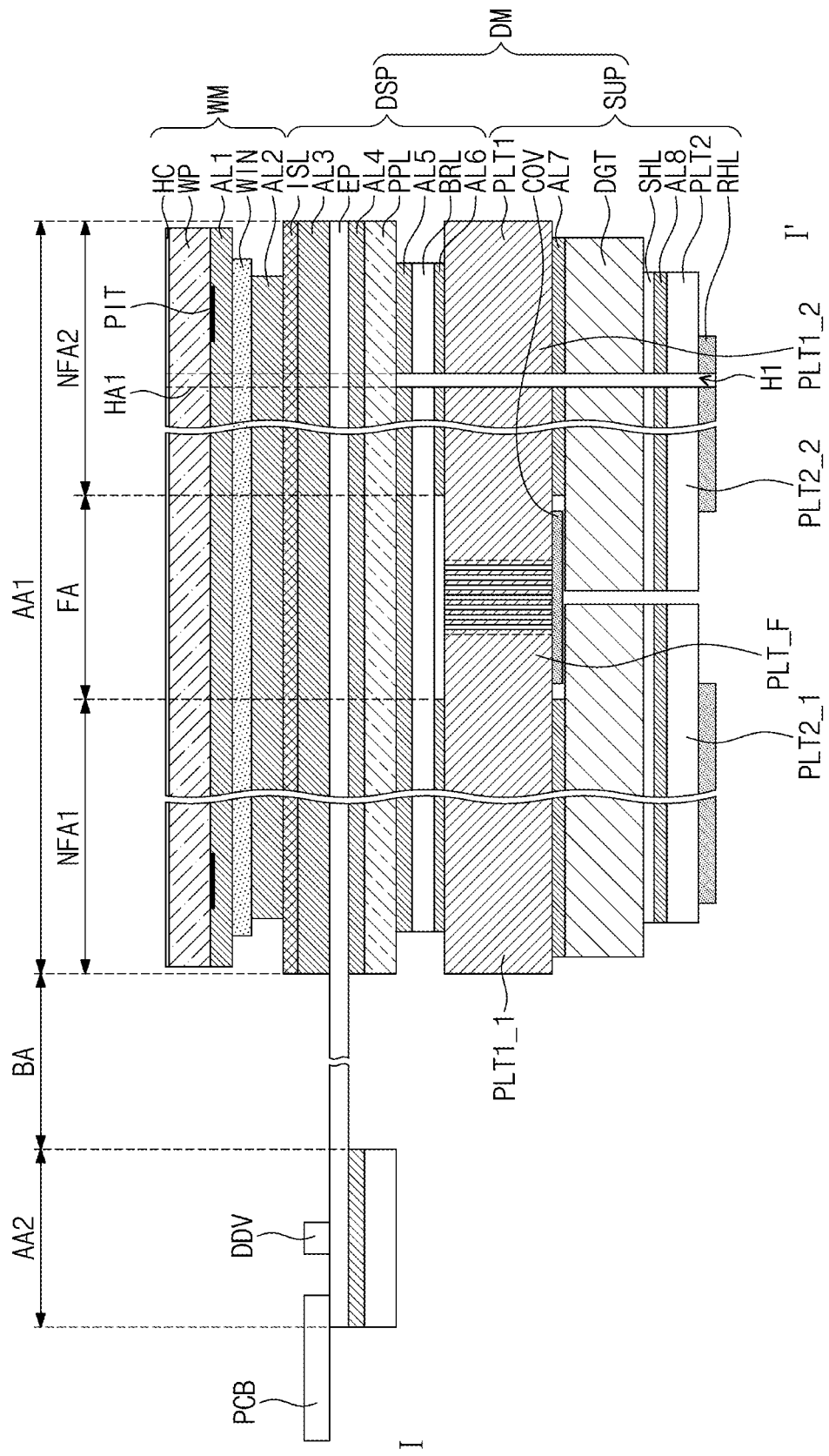
FIG. 8 is a cross-sectional view taken along a line I-I' of FIG. 6.
Figure 9:
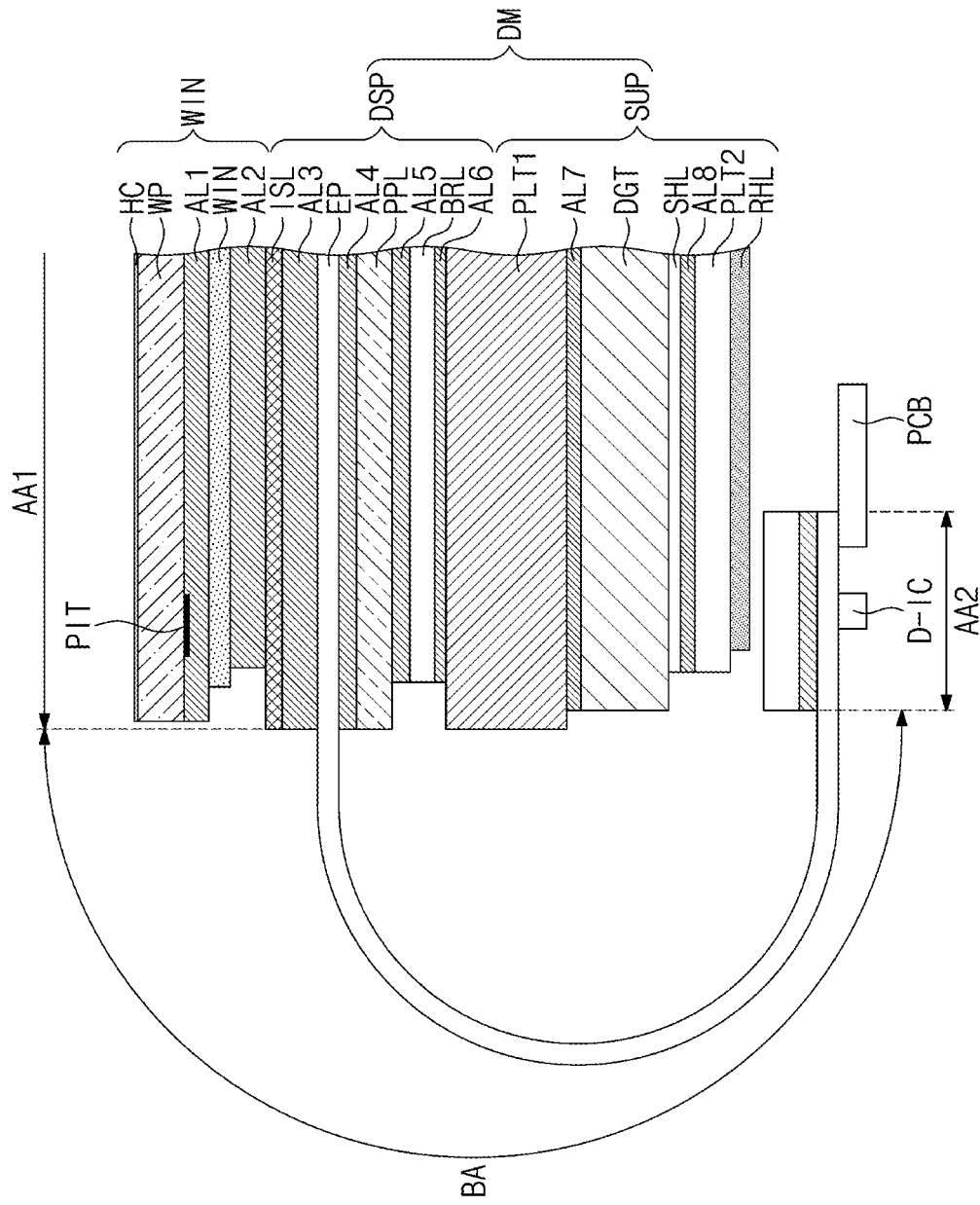
FIG. 9 is a cross-sectional view of a bent state of a bending area of FIG. 8.

FIG. 8 is a cross-sectional view taken along a line I-I' of FIG. 6, and FIG. 9 is a cross-sectional view of a bent state of a bending area of FIG. 8.

As an example, FIG. 8 shows a cross-section of the display module DM and a cross-section of the window module WM, which are taken along the line I-I' of FIG. 6.

Referring to FIG. 8, the display device DD may include the display module DM and the window module WM disposed on the display module DM. The display module DM may be a flexible display module.

The display module DM may include the first non-folding area NFA1, the folding area FA, and the second non-folding area NFA2. As the folding area FA is folded with respect to the folding axis FX, the display module DM may be folded.

The display module DM may include a display part DSP and a support part SUP. The support part SUP may be disposed under the display part DSP and may support the display part DSP.

The window module WM may include a window WIN, a window protective layer WP, a hard coating layer HC, and first and second adhesive layers AL1 and AL2. The display part DSP may include the electronic panel EP, an impact absorbing layer ISL, the panel protective layer PPL, a barrier layer BRL, and third, fourth, fifth, and sixth adhesive layers AL3, AL4, AL5, and AL6. Since configurations of the electronic panel EP and the panel protective layer PPL are previously described with reference to FIG. 5, a description thereof will be omitted for descriptive convenience.

The impact absorbing layer ISL may be disposed on the electronic panel EP. The impact absorbing layer ISL may absorb external impacts applied to the electronic panel EP from the above of the display device DD and may protect the electronic panel EP. The impact absorbing layer ISL may be formed in the form of a stretched film.

The impact absorbing layer ISL may include a flexible plastic material. The flexible plastic material may be defined as a synthetic resin film. As an example, the impact absorbing layer ISL may include the flexible plastic material, such as polyimide (PI) or polyethylene terephthalate (PET).

The window WIN may be disposed on the impact absorbing layer ISL. The window WIN may protect the electronic panel EP from external scratches. The window WIN may have an optically transparent property. The window WIN may include a glass material. However, embodiments are not limited thereto or thereby. According to an embodiment, the window WIN may include a synthetic resin film.

The window WIN may have a single-layer or multi-layer structure. As an example, the window WIN may include a plurality of synthetic resin films attached to each other by an adhesive or a glass substrate and the synthetic resin film attached to the glass substrate by an adhesive.

The window protective layer WP may be disposed on the window WIN. The window protective layer WP may include the flexible plastic material, such as polyimide (PI) or polyethylene terephthalate (PET). The hard coating layer HC may be disposed on the window protective layer WP A print layer PIT may be disposed on a lower surface of the window protective layer WP. The print layer PIT may have a black color. However, a color of the print layer PIT should not be limited to the black color. The print layer PIT may be disposed adjacent to an edge of the window protective layer WP.

The barrier layer BRL may be disposed under the panel protective layer PPL. The barrier layer BRL may increase a resistance to a compressive force caused by an external pressure. Accordingly, the barrier layer BRL may prevent the electronic panel EP from being deformed or damaged. The barrier layer BRL may include the flexible plastic material, such as polyimide or polyethylene terephthalate.

The barrier layer BRL may have a color for absorbing the light. As an example, the barrier layer BRL may have a black color. In this case, when looking at the display module DM from an upper side of the display module DM, components disposed under the barrier layer BRL may not be viewed by the user.

The first adhesive layer AL1 may be disposed between the window protective layer WP and the window WIN. The window protective layer WP may be attached to the window WIN by the first adhesive layer AL1. The first adhesive layer AL1 may cover the print layer PIT.

The second adhesive layer AL2 may be disposed between the window WIN and the impact absorbing layer ISL. The window WIN may be attached to the impact absorbing layer ISL by the second adhesive layer AL2.

The third adhesive layer AL3 may be disposed between the impact absorbing layer ISL and the electronic panel EP. The impact absorbing layer ISL may be attached to the electronic panel EP by the third adhesive layer AL3.

The fourth adhesive layer AL4 may be disposed between the electronic panel EP and the panel protective layer PPL. The electronic panel EP may be attached to the panel protective layer PPL by the fourth adhesive layer AL4.

The fifth adhesive layer AL5 may be disposed between the panel protective layer PPL and the barrier layer BRL. The panel protective layer PPL may be attached to the barrier layer BRL by the fifth adhesive layer AL5.

The sixth adhesive layer AL6 may be disposed between the barrier layer BRL and the support part SUP. A support plate PLT1 of the support part SUP may be disposed under the barrier layer BRL, and the sixth adhesive layer AL6 may be disposed between the barrier layer BRL and the support plate PLT1. The barrier layer BRL may be attached to the support plate PLT1 by the sixth adhesive layer AL6.

The sixth adhesive layer AL6 may overlap the first and second non-folding areas NFA1 and NFA2 and may not overlap the folding area FA. For example, the sixth adhesive layer AL6 may not be disposed in the folding area FA.

The first to sixth adhesive layers AL1 to AL6 may include a transparent adhesive such as a pressure sensitive adhesive (PSA) or an optically clear adhesive (OCA). However, the adhesive should not be particularly limited thereto.

In the following descriptions, a term "thickness" may indicate a numerical value measured in the third direction DR3, and a term "width" may indicate a numerical value measured in the first direction DR1 or the second direction DR2 that is a horizontal direction. Further, a term "elastic modulus" means the unit of measurement of an object's or substance's resistance to being deformed elastically (i.e., non-permanently). Further, the term "elastic modulus" may further mean characteristics regarding folding/unfolding operations (or bending/unbending operations) such as stress modulus, strain modulus, Young's modulus, bulk modulus, and sheer modulus.

The panel protective layer PPL may have a thickness smaller than a thickness of the window protective layer WP, and the barrier layer BRL may have a thickness smaller than the thickness of the panel protective layer PPL. The electronic panel EP may have a thickness smaller than the thickness of the barrier layer BRL and equal to a thickness of the window WIN. The impact absorbing layer ISL may have a thickness smaller than the thickness of the electronic panel EP.

The first adhesive layer AL1 may have a thickness equal to the thickness of the barrier layer BRL, and each of the second adhesive layer AL2 and the third adhesive layer AL3 may have a thickness equal to the thickness of the panel protective layer PPL. The fourth adhesive layer AL4 may have a thickness equal to a thickness of the fifth adhesive layer AL5.

The thickness of each of the fourth adhesive layer AL4 and the fifth adhesive layer AL5 may be smaller than the thickness of the electronic panel EP and may be greater than the thickness of the impact absorbing layer ISL. A thickness of the sixth adhesive layer AL6 may be smaller than the thickness of the impact absorbing layer ISL. The hard coating layer HC may have a thickness smaller than the thickness of the sixth adhesive layer AL6.

The electronic panel EP, the impact absorbing layer ISL, the panel protective layer PPL, and the third and fourth adhesive layers AL3 and AL4 may have the same width as each other. The width of the electronic panel EP may indicate a width of a portion of the electronic panel EP disposed in the first area AA1. The window protective layer WP and the first adhesive layer AL1 may have the same width as each other. The barrier layer BRL and the fifth and sixth adhesive layers AL5 and AL6 may have the same width as each other.

The widths of the electronic panel EP, the impact absorbing layer ISL, the panel protective layer PPL, and the third and fourth adhesive layers AL3 and AL4 may be greater than the widths of the window protective layer WP and the first adhesive layer AL1. Edges of the electronic panel EP, the impact absorbing layer ISL, the panel protective layer PPL, and the third and fourth adhesive layers AL3 and AL4 may be disposed outside of edges of the window protective layer WP and the first adhesive layer AL1.

The widths of the window WIN and the second adhesive layer AL2 may be smaller than the widths of the window protective layer WP and the first adhesive layer AL1. The width of the second adhesive layer AL2 may be smaller than the width of the window WIN. An edge of the window WIN may be disposed inside the edges of the window protective layer WP and the first adhesive layer AL1. An edge of the second adhesive layer AL2 may be disposed inside the edge of the window WIN.

The widths of the barrier layer BRL and the fifth and sixth adhesive layers AL5 and AL6 may be smaller than the widths of the window protective layer WP and the first adhesive layer AL1. Edges of the barrier layer BRL and the fifth and sixth adhesive layers AL5 and AL6 may be disposed inside the edges of the window protective layer WP and the first adhesive layer AL1.

The support part SUP may include the support plate PLT1, a sub-support plate PLT2, a cover layer COV, a digitizer DGT, a shielding layer SHL, a heat dissipation layer RHL, and seventh and eighth adhesive layers AL7 and AL8.

The support plate PLT1 may be disposed under the display part DSP and may support the display part DSP. The support plate PLT1 may support the electronic panel EP.

The support plate PLT1 may have a rigidity greater than that of the display part DSP. The support plate PLT1 may include a non-metallic material. As an example, the support plate PLT1 may include a fiber reinforced composite. The fiber reinforced composite may include a carbon fiber reinforced plastic (CFRP) or a glass fiber reinforced plastic (GFRP).

Since the support plate PLT1 includes the fiber reinforced composite, the support plate PLT1 may be lightweight. As the support plate PLT1 includes the fiber reinforced composite, the support plate PLT1 may have a light weight compared with a metal support plate formed of a metal material and may have a level of elastic modulus and strength similar to those of the metal support plate.

In addition, since the support plate PLT1 includes the fiber reinforced composite, a shape machining process of the support plate PLT1 may be easier compared with the metal support plate. As an example, the support plate PLT1 including the fiber reinforced composite may be easily processed by using a laser process or a micro-blast process.

A plurality of first openings OP1 may be defined in (or formed by passing through) a portion of the support plate PLT1, which overlaps the folding area FA. The first openings OP1 may be formed through the portion of the support plate PLT1 in the third direction DR3. The first openings OP1 may be formed by the laser process or the micro-blast process.

As the first openings OP1 are defined in (or formed by passing through) the portion of the support plate PLT1 overlapping the folding area FA, a flexibility of the portion of the support plate PLT1 overlapping the folding area FA may increase. As a result, the support plate PLT1 may be easily folded with respect to the folding area FA. Details of the shape of the first openings OP1 will be described later. A width of the portion through which the first openings OP1 are defined may be smaller than a width of an opened portion of the sixth adhesive layer AL6.

The support plate PLT1 may include a first support plate PLT1_1, a second support plate PLT1_2, and a folding plate PLT_F. The folding plate PLT_F may be disposed between the first support plate PLT1_1 and the second support plate PLT1_2. The first openings OP1 may be defined in (or formed by passing through) the folding plate PLT_F.

The first support plate PLT1_1 may be disposed under the first non-folding area NFA1 and may overlap the first non-folding area NFA1 when viewed in a plane. The second support plate PLT1_2 may be disposed under the second non-folding area NFA2 and may overlap the second non-folding area NFA2 when viewed in a plane. The folding plate PLT_F may be disposed under the folding area FA and may overlap the folding area FA when viewed in a plane.

The cover layer COV may be disposed under the support plate PLT1. The cover layer COV may cover the first openings OP1 defined in (or formed by passing through) the support plate PLT1 under the support plate PLT1. The cover layer COV may overlap the folding area FA and may not overlap the first and second non-folding areas NFA1 and NFA2. For example, the cover layer COV may not be disposed in the first and second non-folding areas NFA1 and NFA2. The cover layer COV may be in contact with a lower surface of the portion of the support plate PLT1 through which the first openings OP1 are formed.

The cover layer COV may have an elastic modulus of elasticity lower than that of the support plate PLT1. As an example, the cover layer COV may include thermoplastic polyurethane or rubber. However, a material for the cover layer COV should not be particularly limited thereto. The cover layer COV may be formed in the form of a sheet and may be attached to the support plate PLT1.

The digitizer DGT may be disposed under the support plate PLT1. The cover layer COV may be disposed between the support plate PLT1 and the digitizer DGT. The cover layer COV may be spaced apart from an upper surface of the digitizer DGT.

The digitizer DGT is a device that receives location information indicated by the user on the display surface. The digitizer DGT may be implemented in an electromagnetic manner or an electromagnetic resonance manner. As an example, the digitizer DGT may include a digitizer sensor substrate including a plurality of coils. However, embodiments are not limited thereto or thereby. According to an embodiment, the digitizer DGT may be implemented in an active electrostatic manner.

When the user moves a pen on the display device DD, the pen may be driven by an alternating current signal to generate an oscillating magnetic field, and the oscillating magnetic field may induce a signal to the coil. A location of the pen may be detected based on the signal induced to the coil. The digitizer DGT may detect an electromagnetic change caused by the approach of the pen and thus may detect the location of the pen.

When the support plate PLT1 disposed on the digitizer DGT and adjacent to the digitizer DGT includes a metal material, a sensitivity of the digitizer DGT may be lowered due to the metal material. As an example, when a signal transmitted in the display device DD is blocked due to a signal interference by the metal support plate, the digitizer DGT may malfunction. However, according to an embodiment, since the support plate PLT1 disposed on the digitizer DGT includes the fiber reinforced composite that is non-metallic material, the digitizer DGT may be normally or properly operated.

The digitizer DGT may be divided into two portions in the folding area FA. For example, the portions of the digitizer DGT may be connected to a digitizer driver through a flexible circuit board.

The shielding layer SHL may be disposed under the digitizer DGT. The shielding layer SHL may include a metal material. As an example, the shielding layer SHL may include copper. However, the meal material of the shielding layer SHL should not be limited to copper. The shielding layer SHL may be divided into two portions in the folding area FA. The portions of the shielding layer SHL may be disposed under the portions of the digitizer DGT, respectively.

The shielding layer SHL may shield an electromagnetic field that may be applied to the digitizer DGT from a lower side of the display device DD. The shielding layer SHL may be referred to as an electromagnetic shielding layer. Further, the shielding layer SHL including the metal material may function as a heat dissipation layer.

The sub-support plate PLT2 may be disposed under the shielding layer SHL. The sub-support plate PLT2 may have a rigidity greater than that of the display part DSP. The sub-support plate PLT2 may include a metal material such as a stainless steel, e.g., SUS 316. However, the metal material for the sub-support plate PLT2 should not be limited thereto or thereby. According to an embodiment, the sub-support plate PLT2 may include a non-metallic material such as plastic.

The sub-support plate PLT2 may be divided into two portions in the folding area FA. As an example, the sub-support plate PLT2 may include a first sub-support plate PLT2_1 overlapping the first non-folding area NFA1 and a second sub-support plate PLT2_2 overlapping the second non-folding area NFA2.

The first sub-support plate PLT2_1 may support the first non-folding area NFA1. The second sub-support plate PLT2_2 may support the second non-folding area NFA2. The first sub-support plate PLT2_1 and the second sub-support plate PLT2_2 may extend to the folding area FA and may be disposed adjacent to each other in the folding area FA.

The first sub-support plate PLT2_1 and the second sub-support plate PLT2_2 may be spaced apart from each other in the folding area FA. The first sub-support plate PLT2_1 and the second sub-support plate PLT2_2 may support the portion of the support plate PLT1 through which the first openings OP1 are defined in the folding area FA.

When a pressure is applied to the support plate PLT1 from the above of the support plate PLT1, a deformation in the portion of the support plate PLT1 through which the first openings OP1 are defined may be prevented by the first sub-support plate PLT2_1 and the second sub-support plate PLT2_2. Further, the first and second sub-support plates PLT2_1 and PLT2_2 may perform a heat dissipation function.

The heat dissipation layer RHL may be disposed under the sub-support plate PLT2. The heat dissipation layer RHL may be divided into two portions in the folding area FA. The portions of the heat dissipation layer RHL may be disposed under the first and second sub-support plates PLT2_1 and PLT2_2, respectively.

The heat dissipation layer RHL may perform the heat dissipation function. As an example, the heat dissipation layer RHL may include a graphite. However, a material for the heat dissipation layer RHL should not be particularly limited thereto. As the heat dissipation layer RHL performs the heat dissipation function with the sub-support plate PLT2 and the shielding layer SHL, a heat dissipation performance of the display device DD may be improved.

The seventh adhesive layer AL7 may be disposed between the support plate PLT1 and the digitizer DGT. The support plate PLT1 may be attached to the digitizer DGT by the seventh adhesive layer AL7. The seventh adhesive layer AL7 may not be disposed in the folding area FA. For example, the seventh adhesive layer AL7 may be opened or exposed in the folding area FA. The cover layer COV may be disposed in the opening of the seventh adhesive layer AL7. Since the seventh adhesive layer AL7 is not disposed in the folding area FA, the support part SUP may be easily folded.

The eighth adhesive layer AL8 may be disposed between the shielding layer SHL and the sub-support plate PLT2. The shielding layer SHL may be attached to the sub-support plate PLT2 by the eighth adhesive layer AL8. The eighth adhesive layer AL8 may be divided into portions in the folding area FA. Each portion of the eighth adhesive layer AL8 may be disposed between a corresponding portion of the portions of the shielding layer SHL and a corresponding sub-support plate of the first and second sub-support plates PLT2_1 and PLT2_2.

The support plate PLT1 may have substantially the same width as that of the electronic panel EP. Widths of the digitizer DGT and the seventh adhesive layer AL7 may be smaller than the width of the support plate PLT1. Edges of the digitizer DGT and the seventh adhesive layer AL7 may be disposed inside an edge of the support plate PLT1.

The widths of the shielding layer SHL, the eighth adhesive layer AL8, and the sub-support plate PLT2 may be smaller than the width of the digitizer DGT. Edges of the shielding layer SHL, the eighth adhesive layer AL8, and the sub-support plate PLT2 may be disposed inside the edge of the digitizer DGT.

The support plate PLT1 may have a thickness greater than a thickness of the digitizer DGT, and the thickness of the digitizer DGT may be greater than a thickness of the sub-support plate PLT2. The thickness of the sub-support plate PLT2 may be greater than a thickness of the heat dissipation layer RHL, and the thickness of the heat dissipation layer RHL may be greater than a thickness of each of the seventh and eighth adhesive layers AL7 and AL8.

The thickness of each of the seventh and eighth adhesive layers AL7 and AL8 may be greater than a thickness of the shielding layer SHL, and the thickness of the shielding layer SHL may be greater than a thickness of the cover layer COV. The thickness of the cover layer COV may be the same as the thickness of the sixth adhesive layer AL6.

Each of the seventh and eighth adhesive layers AL7 and AL8 may include a pressure sensitive adhesive (PSA) or an optically clear adhesive (OCA). However, embodiments are not particularly limited thereto.

A first hole H1 may be defined or formed in a portion of the display module DM, which overlaps the first hole area HA1. The first hole H1 may be defined in (or formed by passing through) from the heat dissipation layer RHL to the fifth adhesive layer AL5. For example, the first hole H1 may not be formed through the panel protective layer PPL. As an example, the first hole H1 may be defined in (or formed by passing through) the barrier layer BRL, the support plate PLT1, the digitizer DGT, the shielding layer SHL, the sub-support plate PLT2, the heat dissipation layer RHL, and the fifth to eighth adhesive layers AL5 to AL8.

For example, a second hole H2 may be defined in the second hole area HA2, and the second hole H2 may be defined in (or formed by passing through) from the heat dissipation layer RHL to the fifth adhesive layer AL5. For example, the second hole H2 may not be formed through the panel protective layer PPL in the same manner as in the first hole H1. The camera CA may be disposed in the first hole H1, and the sensor SN may be disposed in the second hole H2.

Referring to FIGS. 8 and 9, the panel protective layer PPL and the fourth adhesive layer AL4 may not be disposed in the bending area BA. The panel protective layer PPL and the fourth adhesive layer AL4 may be disposed in the second area AA2 of the electronic panel EP. The data driver DDV may be disposed on the electronic panel EP in the second area AA2.

The printed circuit board PCB may be connected to the second area AA2 of the electronic panel EP. The printed circuit board PCB may be connected to one side of the second area AA2. The bending area BA may be bent, and thus the second area AA2 may be disposed under the first area AA1 to overlap each other, e.g., in the third direction DR3. Accordingly, the data driver DDV and the printed circuit board PCB may be disposed under the first area AA1.

Figure 10:
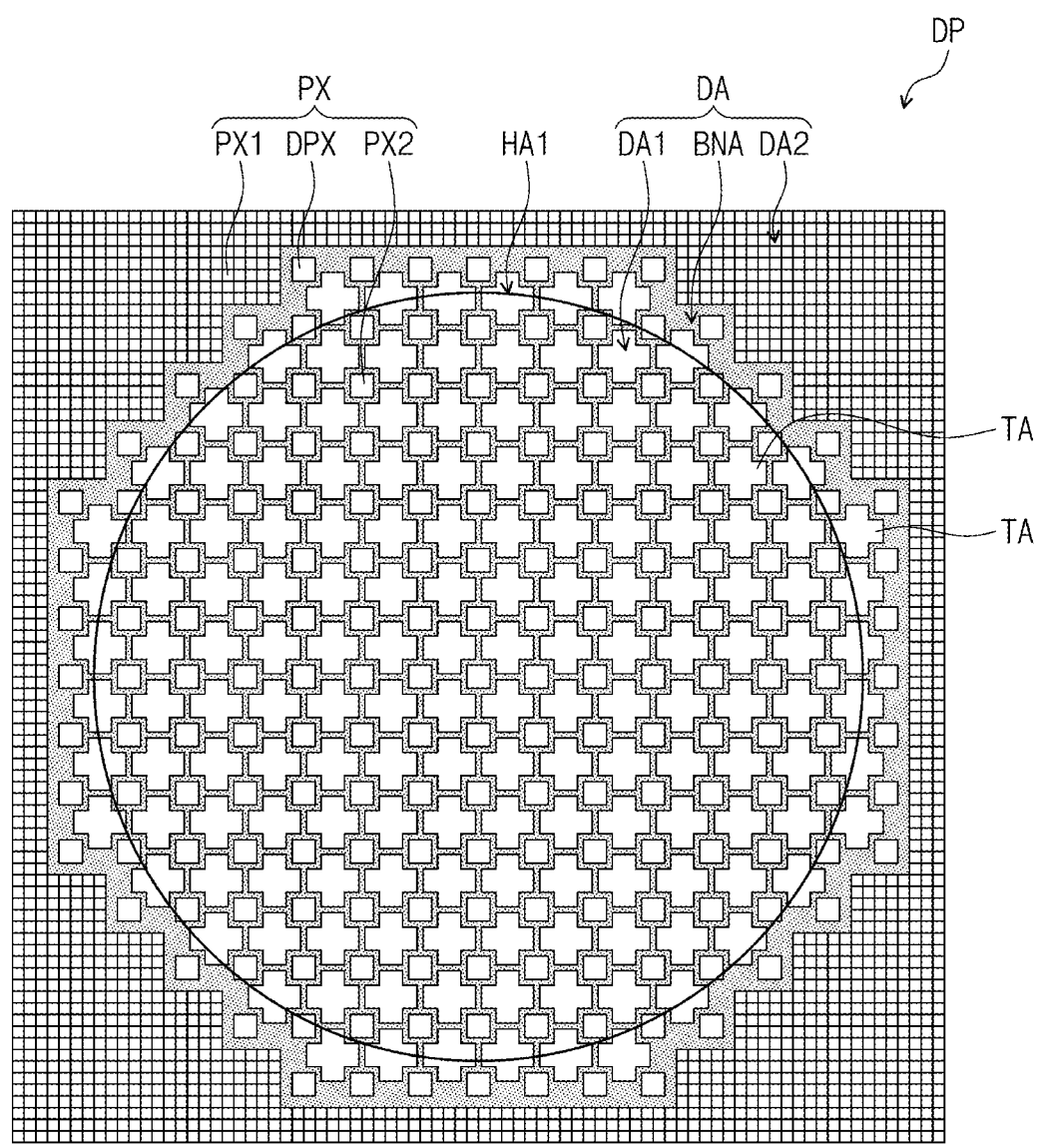
FIG. 10 is an enlarged plan view of a first hole area of a display panel of FIG. 8.
Figure 10:
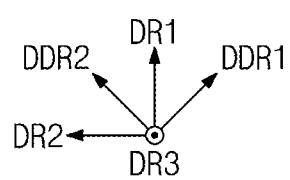

FIG. 10 is an enlarged plan view of the first hole area HA1 of the display panel of FIG. 8.

In FIG. 10, only a configuration of the first hole area HA1 in a plane is shown as a representative example. However, a configuration of the second hole area HA2 in a plane may be the same as that of the first hole area HA1.

Referring to FIG. 10, the display area DA may include a first display area DA1, a second display area DA2 around the first display area DA1, and a boundary area BNA between the first display area DA1 and the second display area DA2. The first display area DA1 may be defined by the first hole area HA1.

The pixels PX may include a plurality of first pixels PX1, a plurality of second pixels PX2, and a plurality of dummy pixels DPX. The first pixels PX1 may be disposed in the second display area DA2. The second pixels PX2 may be disposed in the first display area DA1. The dummy pixels DPX may be disposed in the boundary area BNA. As an example, the boundary area BNA adjacent to the second display area DA2 may have an octagonal shape. However, the shape of the boundary area BNA should not be particularly limited thereto.

As an example, the second pixels PX2 may be arranged in the first display area DA1 in the first direction DR1 and the second direction DR2. However, an arrangement of the second pixels PX2 should not be limited thereto or thereby. The dummy pixels DPX may be arranged along the boundary area BNA to surround the first display area DA1. Each of the second pixels PX2 and the dummy pixels DPX may include a plurality of sub-pixels displaying red, green, and blue colors. The first pixels PX1 and the sub-pixels may have the structure of FIG. 7.

The second pixels PX2 may display an image through the first display area DA1. The first pixels PX1 may display an image through the second display area DA2. The dummy pixels DPX may display an image through the boundary area BNA. Accordingly, a predetermined image may be displayed through the display area DA due to lights generated by the first pixels PX1, the second pixels PX2, and the dummy pixels DPX.

The display panel DP may include a plurality of transmission areas TA overlapping the first hole area HA1. The transmission areas TA may be disposed between the second pixels PX2. In addition, the transmission areas TA may be disposed between the dummy pixels DPX and the second pixels PX2 adjacent to the dummy pixels DPX.

As an example, the transmission areas TA may have a cross shape. However, the shape of the transmission areas TA should not be particularly limited thereto. The transmission areas TA may be defined adjacent to each of the second pixels PX2. The transmission areas TA may be arranged in a first diagonal direction DDR1 and a second diagonal direction DDR2 with respect to the second pixels PX2.

The first diagonal direction DDR1 may be defined as a direction intersecting the first and second directions DR1 and DR2 on the plane defined by the first and second directions DR1 and DR2. The second diagonal direction DDR2 may be defined as a direction intersecting the first diagonal direction DDR1 on the plane defined by the first and second directions DR1 and DR2. As an example, the first and second directions DR1 and DR2 may perpendicularly cross each other, and the first and second diagonal directions DDR1 and DDR2 may substantially perpendicularly cross each other.

The transmission areas TA may have a light transmittance higher than that of the first and second pixels PX1 and PX2 and the dummy pixels DPX. A light (e.g., the above-described optical signal) may be provided to the camera CA disposed in the first display area DA1 after passing or transmitting through the transmission areas TA. For example, the light transmittance of the transmission areas TA may be improved by the first hole area HA1, and the light may be provided to the camera CA via the first hole area HA1. Accordingly, the image may be displayed through the first display area DA1, and further, the light may be provided to the camera CA after transmitting through the first display area DA1 such that the camera CA may take a picture.

Figure 11:
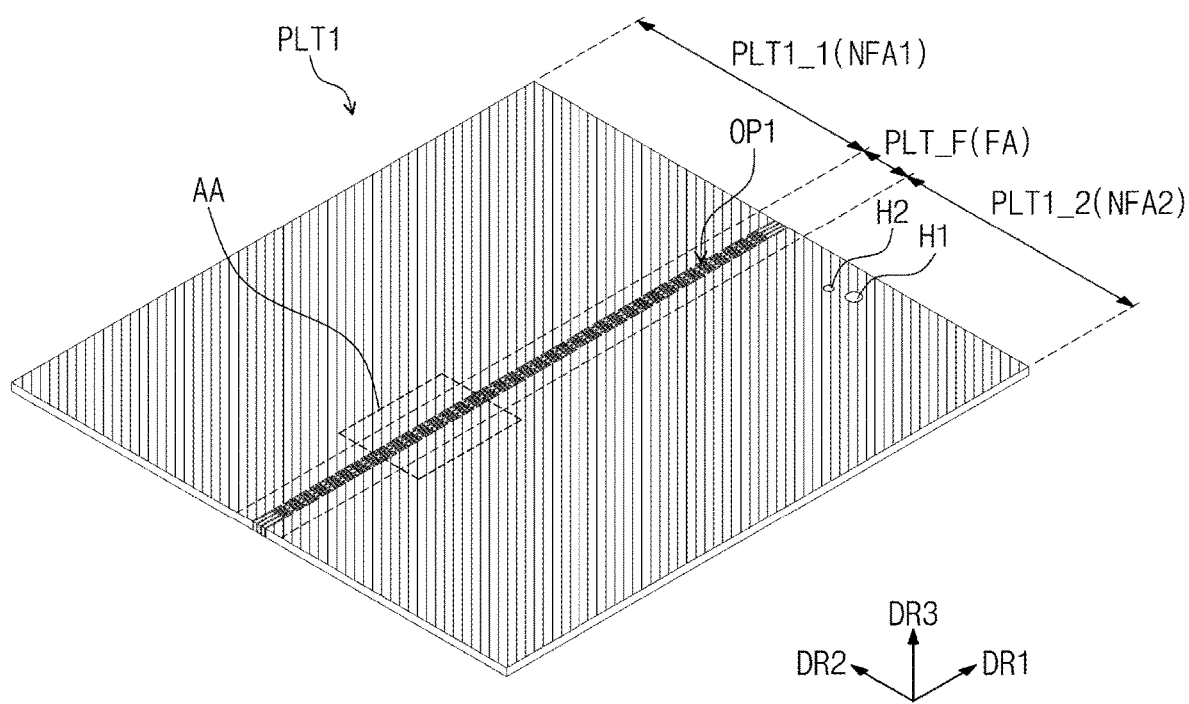
FIG. 11 is a perspective view of a support plate of FIG. 8.

FIG. 11 is a perspective view of the support plate PLT1 of FIG. 8.

Referring to FIGS. 8 and 11, the support plate PLT1 may include the first support plate PLT1_1, the folding plate PLT_F, and the second support plate PLT1_2, which are arranged in the second direction DR2. As described above, the first support plate PLT1_1, the folding plate PLT_F, and the second support plate PLT1_2 may overlap the first non-folding area NFA1, the folding area FA, and the second non-folding area NFA2, respectively.

The folding plate PLT_F may be provided with a grid pattern defined therein. As an example, the first openings OP1 may be defined in (or formed by passing through) the folding plate PLT_F. The first openings OP1 may be arranged in a predetermined rule or pattern. The first openings OP1 may be arranged in a grid shape to form the grid pattern of the folding plate PLT_F. The area in which the first openings OP1 are formed may be smaller than the width of the folding plate PLT_F with respect to the second direction DR2.

As the first openings OP1 are defined in (or formed by passing through) the folding plate PLT_F, an area of the folding plate PLT_F may be reduced, and a rigidity of the folding plate PLT_F may decrease. Accordingly, the flexibility of the folding plate PLT_F may be higher when the first openings OP1 are defined in (or by passing through) the folding plate PLT_F than when the first openings OP1 are not defined through the folding plate PLT_F. As a result, the folding plate PLT_F may be easily folded.

The first hole H1 and the second hole H2 may be defined through the second support plate PLT1_2. The first hole H1 and the second hole H2 may be defined adjacent to an edge of the second support plate PLT1_2.

Figure 12:
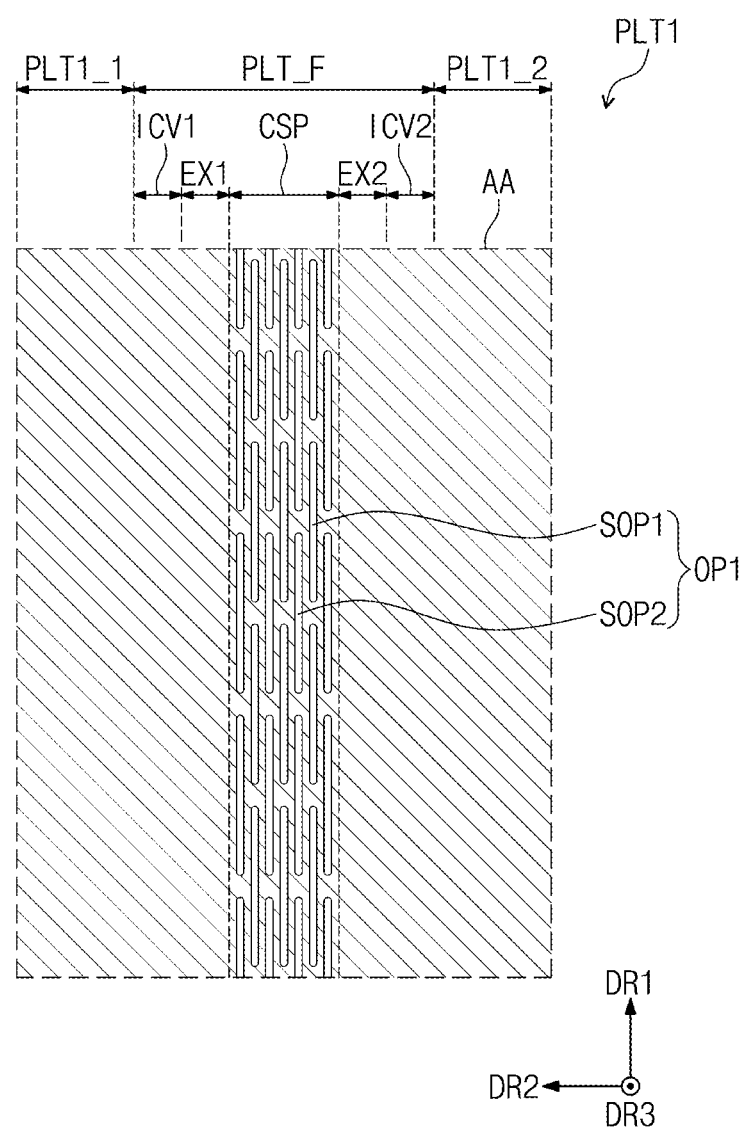
FIG. 12 is an enlarged plan view of an area AA of FIG. 11.

FIG. 12 is an enlarged plan view of an area AA of FIG. 11.

Referring to FIG. 12, the folding plate PLT_F may include a curved portion CSP, a first extension portion EX1, a second extension portion EX2, a first reverse curvature portion ICV1, and a second reverse curvature portion ICV2. The curved portion CSP, the first extension portion EX1, the second extension portion EX2, the first reverse curvature portion ICV1, and the second reverse curvature portion ICV2 may be arranged in the second direction DR2.

As an example, the curved portion CSP may be disposed at a center of the folding plate PLT_F. The first reverse curvature portion ICV1 may be defined as a portion of the folding plate PLT_F, which is adjacent to the first support plate PLT1_1. The second reverse curvature portion ICV2 may be defined as a portion of the folding plate PLT_F, which is adjacent to the second support plate PLT1_2.

The curved portion CSP may be disposed between the first reverse curvature portion ICV1 and the second reverse curvature portion ICV2. In detail, the curved portion CSP may be disposed between the first extension portion EX1 and the second extension portion EX2.

The first extension portion EX1 may be disposed between the first reverse curvature portion ICV1 and the curved portion CSP. The second extension portion EX2 may be disposed between the second reverse curvature portion ICV2 and the curved portion CSP.

The first reverse curvature portion ICV1 may be disposed between the first support plate PLT1_1 and the first extension portion EX1. The second reverse curvature portion ICV2 may be disposed between the second support plate PLT1_2 and the second extension portion EX2.

The first openings OP1 may be defined through the curved portion CSP. The first openings OP1 may be arranged in the first direction DR1 and the second direction DR2. The first openings OP1 may extend longer in the first direction DR1 than in the second direction DR2. For example, each of the first opening OP1 may have a first gap in the first direction DR1 and a second gap in the second direction DR2, which is shorter than the first gap. The first openings OP1 may extend in a direction substantially parallel to the folding axis FX.

The first openings OP1 may include a plurality of first sub-openings SOP1 arranged in the first direction DR1 and a plurality of second sub-openings SOP2 adjacent to the first sub-openings SOP1 in the second direction DR2 and arranged in the first direction DR1. The first sub-openings SOP1 may be interlaced with the second sub-openings SOP2. For example, the first sub-openings SOP1 and the second sub-openings SOP2 may partially overlap in the second direction DR2, and may not overlap in the first direction DR1.

Figure 13:
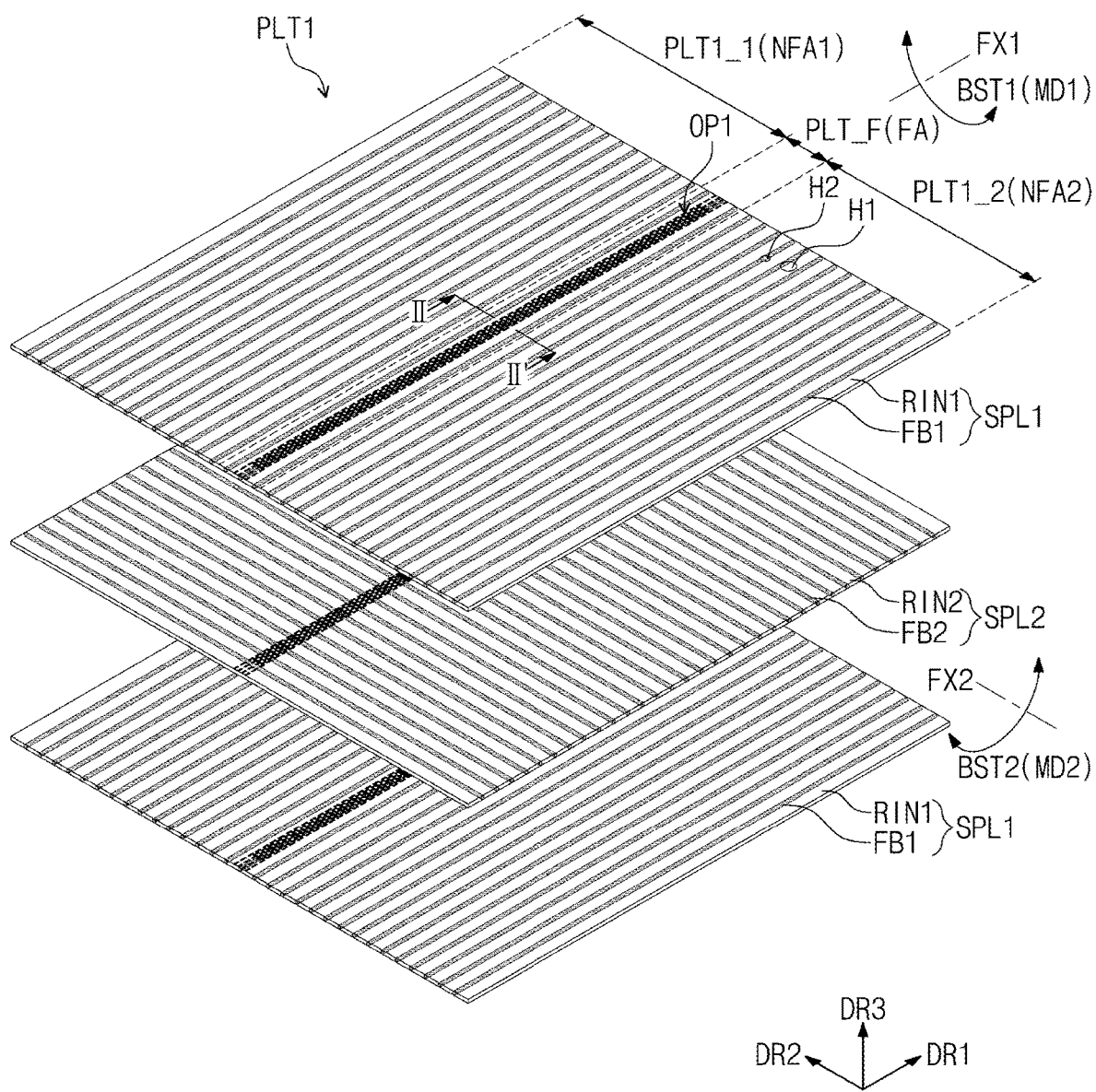
FIG. 13 is a perspective view of a support plate of FIG. 11.
Figure 14:
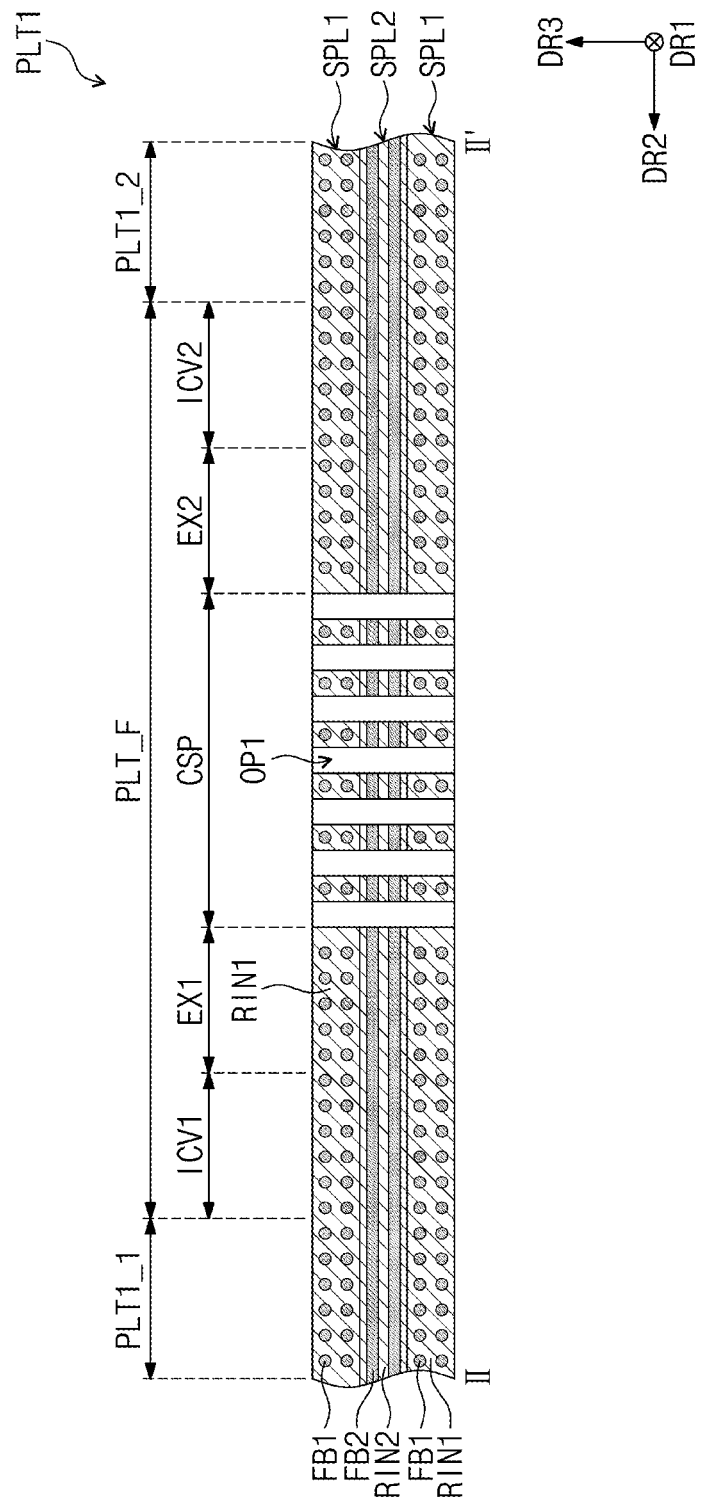
FIG. 14 is a cross-sectional view taken along a line II-II' of FIG. 13.

FIG. 13 is a perspective view of the support plate PLT1 of FIG. 11, and FIG. 14 is a cross-sectional view taken along a line II-II' of FIG. 13.

In FIG. 13, the first openings OP1 are shown as a dotted line.

Referring to FIGS. 13 and 14, the support plate PLT1 may include at least one first support layer SPL1 and at least one second support layer SPL2 disposed on a layer different from a layer on which the first support layer SPL1 is disposed. The at least one first support layer SPL1 and the at least one second support layer SPL2 may be components of each of the first support plate PLT1_1, the folding plate PLT_F, and the second support plate PLT1_2.

The number of the at least one first support layers SPL1 may be greater than the number of the at least one second support layers SPL2. The at least one first support layer SPL1 may include a plurality of first support layers SPL1 respectively defining an upper surface of the support plate PLT1 and a lower surface of the support plate PLT1 opposite to the upper surface of the support plate PLT1. The upper surface of the support plate PLT1 may face the display panel DP. The at least one second support layer SPL2 may include the second support layer SPL2 disposed between the first support layers SPL1.

As an example, two first support layers SPL1 and one second support layer SPL2 are shown. However, the number of the first and second support layers SPL1 and SPL2 should not be limited thereto or thereby as long as the number of the first support layers SPL1 is greater than the number of the second support layers SPL2.

As an example, a thickness of each of the first support layers SPL1 may be the same as a thickness of the second support layer SPL2 with respect to a direction substantially perpendicular to the upper surface of the support plate PLT1, e.g., the third direction DR3. The first openings OP1 may be defined in (or formed by passing through) the first and second support layers SPL1 and SPL2 in the third direction DR3.

Each of the first support layers SPL1 may include a first resin RIN1 and a plurality of first fibers FB1 immersed in the first resin RIN1. The first fibers FB1 may extend in the first direction DR1 and may be arranged in the second direction DR2. The first fibers FB1 may extend in the same direction as the direction in which the first openings OP1 extend. Accordingly, the first fibers FB1 may extend substantially parallel to the folding axis FX.

The second support layer SPL2 may include a second resin RIN2 and a plurality of second fibers FB2 immersed in the second resin RIN2. The second fibers FB2 may extend in the second direction DR2 and may be arranged in the first direction DR1. The second fibers FB2 may extend in a direction different from the direction in which the first openings OP1 extend. The second fibers FB2 may extend in a direction intersecting the folding axis FX.

The first and second resins RIN1 and RIN2 may include a polymer resin. The first and second resins RIN1 and RIN2 may be formed of a thermoplastic resin. As an example, the first and second resins RIN1 and RIN2 may include a polyamide-based resin and a polypropylene-based resin.

The first and second fibers FB1 and FB2 may include a reinforced fiber. As an example, the reinforced fiber may include a carbon fiber or a glass fiber. Each of the first and second fibers FB1 and FB2 may be formed as a single thread of a fiber. Each of the first and second fibers FB1 and FB2 may be formed of a set of sub-fibers. As an example, the sub-fibers may be bundled together to form the single fiber thread.

The first openings OP1 may be defined to extend in the first direction DR1 to form the grid pattern in the support plate PLT1. In a case where the first fibers FB1 of the first support layers SPL1, which form a surface of the support plate PLT1, extend in the second direction DR2 intersecting the first openings OP1, defects may occur during the processing of the first openings OP1.

As an example, when the first openings OP1 extending in the first direction DR1 are formed through the first fibers FB1 extending in the second direction DR2, cut portions of the first fibers FB1 may protrude to the outside. Accordingly, when the first openings OP1 are formed to cross (or to pass through) the first fibers FB1, the surface of the portion of the support plate PLT1 in which the grid pattern is formed may become rough.

According to an embodiment, the first fibers FB1 of the first support layers SPL1, which form the surface of the support plate PLT1, may be arranged in parallel to the extension direction of the first openings OP1. When the first openings OP1 are defined in the direction parallel to the extension direction of the first fibers FB1, the surface of the portion of the support plate PLT1 in which the grid pattern is formed may not become rough.

According to an embodiment, an elastic modulus of the folding plate PLT_F formed by the first and second support layers SPL1 and SPL2 may be different according to the first direction DR1 and the second direction DR2. The elastic modulus of the folding plate PLT_F may correspond to a bending strength that occurs when the folding plate PLT_F is folded. As the bending strength increases, the elastic modulus may increase, and thus, the folding plate PLT_F may not be easily bent. As the bending strength decreases, the elastic modulus may decrease, and thus, the folding plate PLT_F may be easily bent.

The folding plate PLT_F may have a first elastic modulus MD1 with respect to the second direction DR2 and may have a second elastic modulus MD2 with respect to the first direction DR1. The first elastic modulus MD1 may correspond to a bending strength BST1 with respect to the second direction DR2 when the folding plate PLT_F is folded in the second direction DR2. The second elastic modulus MD2 may correspond to a bending strength BST2 with respect to the first direction DR1 when the folding plate PLT_F is folded in the first direction DR1.

An operation in which the folding plate PLT_F is folded in the second direction DR2 may be defined as an operation in which the folding plate PLT_F is folded with respect to a first folding axis FX1 parallel to the first direction DR1. An operation in which the folding plate PLT_F is folded in the first direction DR1 may be defined as an operation in which the folding plate PLT_F is folded with respect to a second folding axis FX2 parallel to the second direction DR2.

The first elastic modulus MD1 of the folding plate PLT_F formed by the first and second support layers SPL1 and SPL2 may be smaller than the second elastic modulus MD2 of the folding plate PLT_F formed by the first and second support layers SPL1 and SPL2. The difference between the first elastic modulus MD1 and the second elastic modulus MD2 may be caused by the first and second fibers FB1 and FB2 of the first and second support layers SPL1 and SPL2.

The first fibers FB1 of the first support layers SPL1 with a greater number than the second support layer SPL2 may extend in the first direction DR1. The second fibers FB2 of the second support layer SPL2 with a smaller number than the first support layers SPL1 may extend in the second direction DR2. A greater number of first fibers FB1 than the second fibers FB2 may be disposed above and below the second fibers FB2.

In this case, the folding plate PLT_F may be more easily folded with respect to the first folding axis FX1 in the second direction DR2 by the first fibers FB1 extending in the first direction DR1. For example, the bending strength of the folding plate PLT_F with respect to the second direction DR2 may decrease, and thus, the first elastic modulus MD1 of the folding plate PLT_F may decrease.

In addition, since a greater number of first fibers FB1 than the second fibers FB2 may be disposed above and below the second fibers FB2, the folding plate PLT_F may not be folded easily in the first direction DR1 with respect to the second folding axis FX2. For example, the bending strength of the folding plate PLT_F with respect to the first direction DR1 may increase, and thus, the second elastic modulus MD2 of the folding plate PLT_F may increase.

Since the first elastic modulus MD1 is smaller than the second elastic modulus MD2, the folding plate PLT_F may be more easily folded with respect to the first folding axis FX1.

Figure 15:
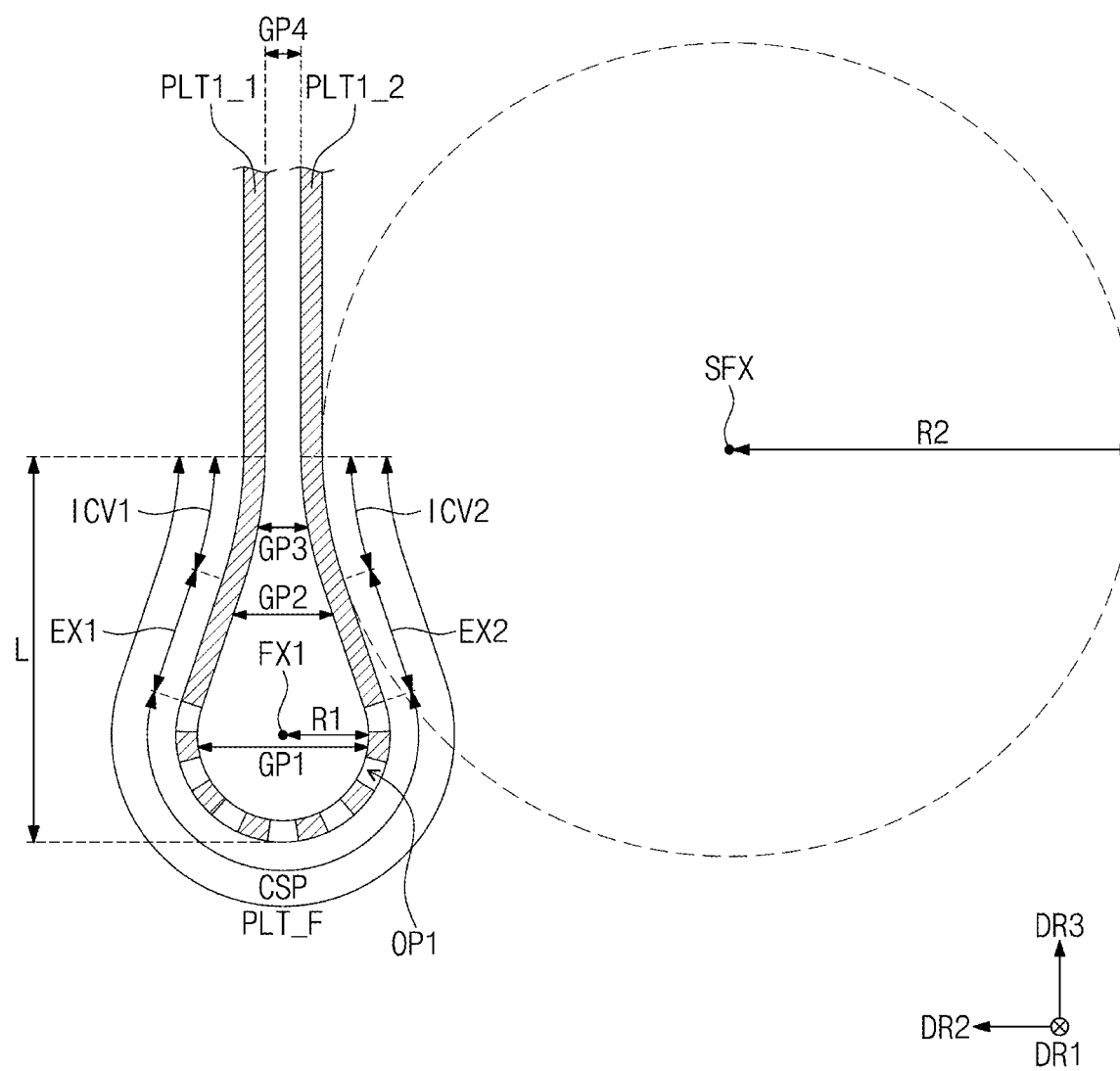
FIG. 15 is a cross-sectional view of a folded state of a support plate of FIG. 12.
Figure 16:
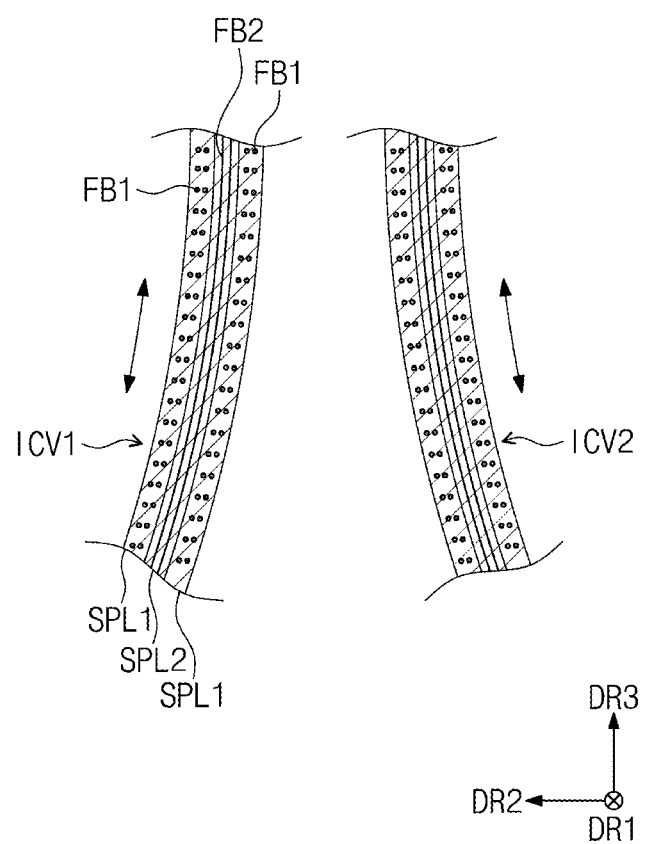
FIG. 16 is an enlarged view of first and second reverse curvature portions of FIG. 15.

FIG. 15 is a cross-sectional view of a folded state of the support plate PLT1 of FIG. 12, and FIG. 16 is an enlarged view of the first and second reverse curvature portions ICV1 and ICV2 of FIG. 15.

As an example, FIG. 15 shows a cross-section of the support plate PLT1 when viewed in the first direction DR1, and FIG. 16 shows cross-sections of the first and second support layers SPL1 and SPL2 of the first and second reverse curvature portions ICV1 and ICV2.

Referring to FIG. 15, the folding plate PLT_F may be folded with respect to the first folding axis FX1, and thus the support plate PLT1 may be folded. When the folding plate PLT_F is folded, the curved portion CSP may be folded to have a predetermined curvature. The curved portion CSP may have a first radius of curvature R1.

The first reverse curvature portion ICV1 may be curved in a direction opposite to a direction in which the curved portion CSP is bent. The second reverse curvature portion ICV2 may be curved in a direction opposite to the direction in which the curved portion CSP is bent. The second reverse curvature portion ICV2 may have a shape symmetrical to that of the first reverse curvature portion ICV1.

When the folding plate PLT_F is folded, the first support plate PLT1_1 and the second support plate PLT1_2 may be maintained in a flat state. When the folding plate PLT_F is folded, a distance GP4 in the second direction DR2 between the first support plate PLT1_1 and the second support plate PLT1_2 may be smaller than the first radius of curvature R1. According to the configurations, the folding plate PLT_F may be folded in the dumbbell shape.

Inner surfaces of the first and second reverse curvature portions ICV1 and ICV2, which face each other, may be curved to have a predetermined curvature. A radius of curvature with respect to the inner surface of each of the first and second reverse curvature portions ICV1 and ICV2 may be defined as a second radius of curvature R2.

The first extension portion EX1 may extend evenly (in a substantially flat shape) between the curved portion CSP and the first reverse curvature portion ICV1. The second extension portion EX2 may extend evenly (in a substantially flat shape) between the curved portion CSP and the second reverse curvature portion ICV2.

When the folding plate PLT_F is folded, a length L of the folding plate PLT_F may be defined as a distance between an end of the curved portion CSP and a boundary between the first and second reverse curvature portions ICV1 and ICV2 and the first and second support plates PLT1_1 and PLT1_2. The length L of the folding plate PLT_F may be defined as a length in the third direction DR3. For example, when the folding plate PLT_F is folded, a distance GP2 between the first and second extension portions EX1 and EX2 in the second direction DR2 may be gradually decreased (e.g., in a linear function) as moving toward the first and second reverse curvature portions ICV1 and ICV2. For example, when the folding plate PLT_F is folded, a distance GP3 between the first and second reverse curvature portions ICV1 and ICV2 in the second direction DR2 may be gradually decreased (e.g., in an exponential function) as moving toward the first and second support plates PLT1_1 and PLT1_2. For example, the distance GP4 in the second direction DR2 between the first support plate PLT1_1 and the second support plate PLT1_2 may be substantially constant. For example, when the folding plate PLT_F is folded, the maximum value of a distance GP1 between inner surfaces of the curved portion CSP may be about two times of the first radius of curvature R1, and may be greater than the distances GP2, GP3, and GP4. For example, the distance GP2 may be greater than the distances GP3 and GP4.

Referring to FIGS. 15 and 16, when the folding plate PLT_F is folded, the curved portion CSP may be folded with respect to the first folding axis FX1. Each of the first and second reverse curvature portions ICV1 and ICV2 may be curved with respect to a sub-folding axis SFX extending in the first direction DR1.

Since the first openings OP1 are defined in the curved portion CSP, a flexibility of the curved portion CSP may be improved. Accordingly, the curved portion CSP may be more easily folded.

As described above, the bending strength of the folding plate PLT_F with respect to the second direction DR2 may decrease by the first support layers SPL1, and thus, the first elastic modulus MD1 of the folding plate PLT_F may be smaller than the second elastic modulus MD2. As the folding plate PLT_F has the relatively small first elastic modulus MD1 with respect to the second direction DR2, the first and second reverse curvature portions ICV1 and ICV2 may be more easily curved or bent.

Since the curved portion CSP and the first and second reverse curvature portions ICV1 and ICV2 are more easily curved or bent, the folding plate PLT_F may be easily folded in the dumbbell shape.

Figure 17:
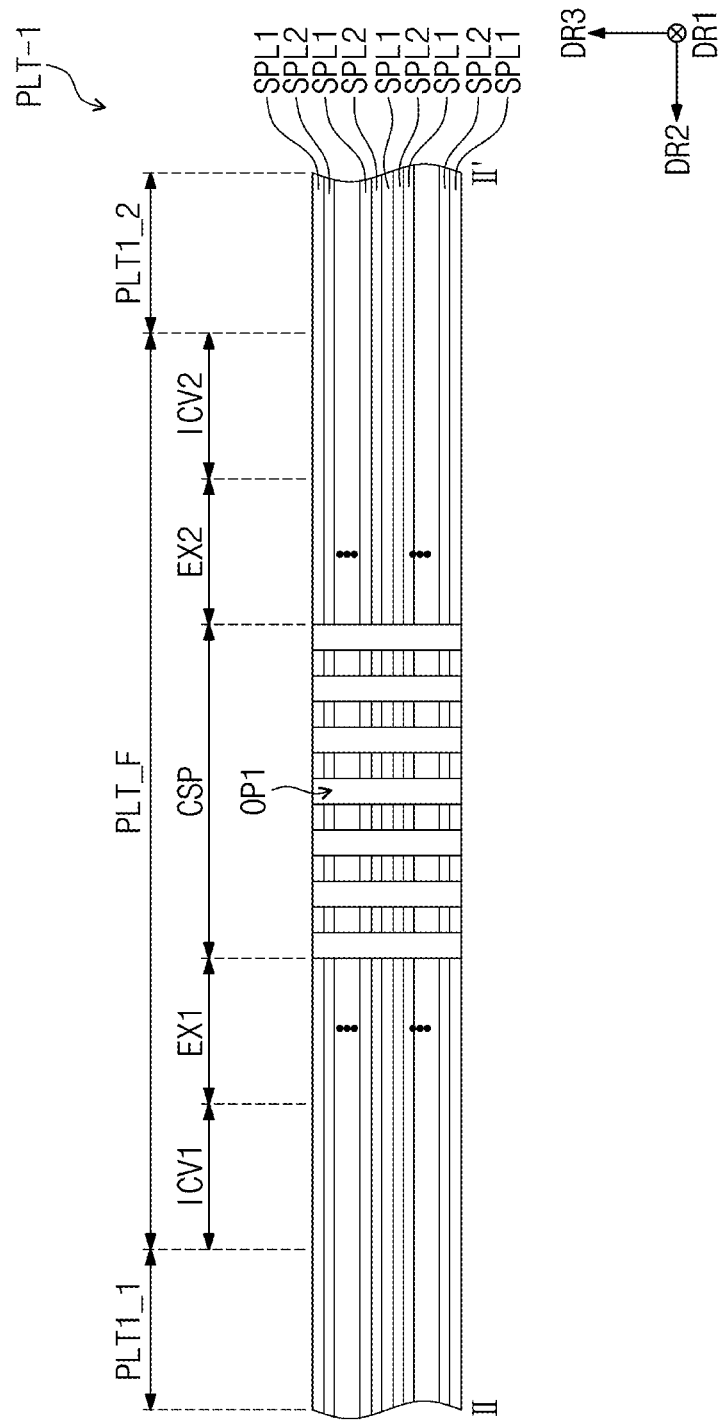
FIG. 17 is a cross-sectional view of an embodiment of a support plate.

FIG. 17 is a cross-sectional view of a support plate PLT-1 according to an embodiment.

As an example, FIG. 17 shows support layers SPL1 and SPL2 each having a single-layer structure, and first and second fibers FB1 and FB2 of first and second support layers SPL1 and SPL2 are omitted.

Referring to FIG. 17, the support plate PLT-1 may include a plurality of first support layers SPL1 and a plurality of second support layers SPL2 disposed between the first support layers SPL1. The number of the first support layers SPL1 may be greater than the number of the second support layers SPL2.

The embodiment of FIG. 17 is different from the embodiment of FIG. 14 in that the number of the first support layers SPL1 may be greater than 2, and the number of the second support layers SPL2 may be greater than 1. Two first support layers SPL1 may define an upper surface and a lower surface of the support plate PLT-1, respectively. The first and second support layers SPL1 and SPL2 may be alternately arranged with each other between the first support layers SPL1 that define the upper surface and the lower surface of the support plate PLT-1.

Figure 18:
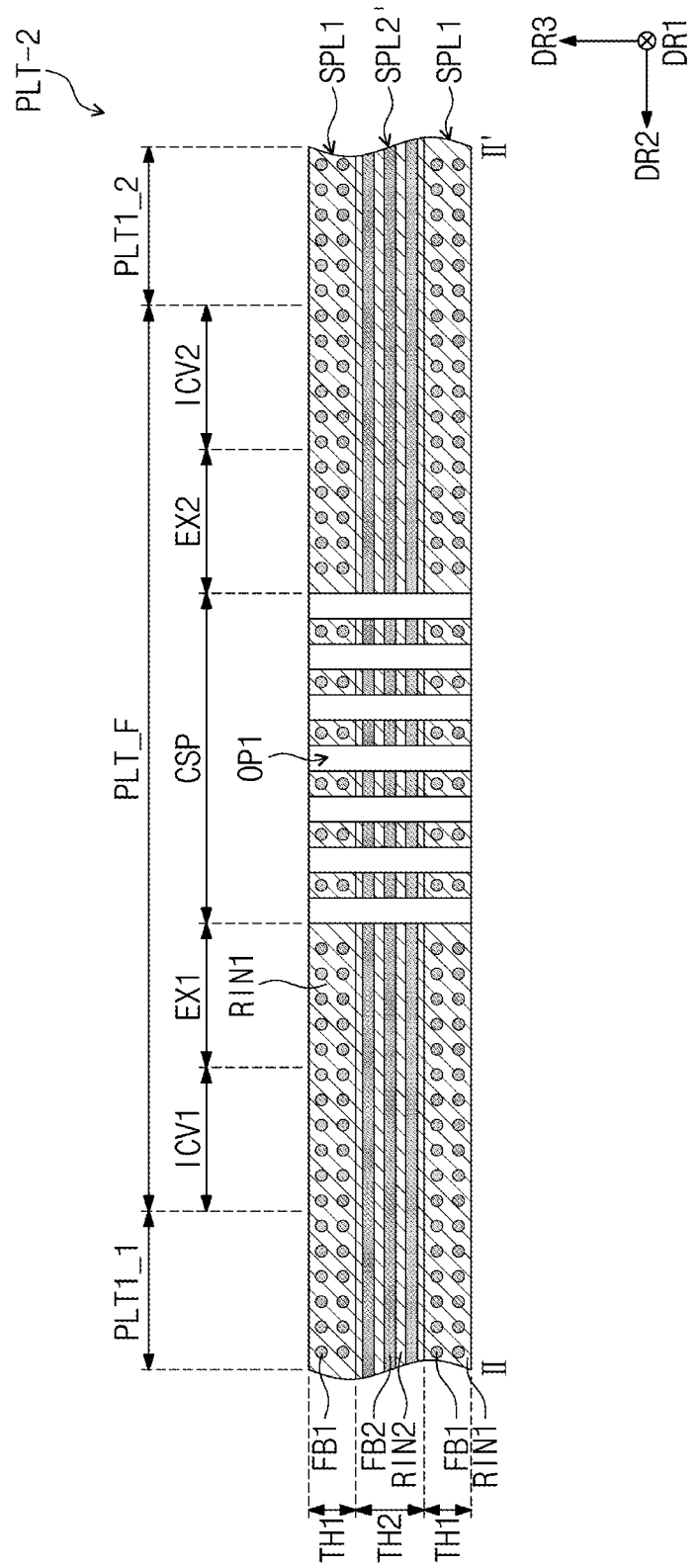
FIGS. 18, 19, and 20 are cross-sectional views of various embodiments of support plates.
Figure 19:
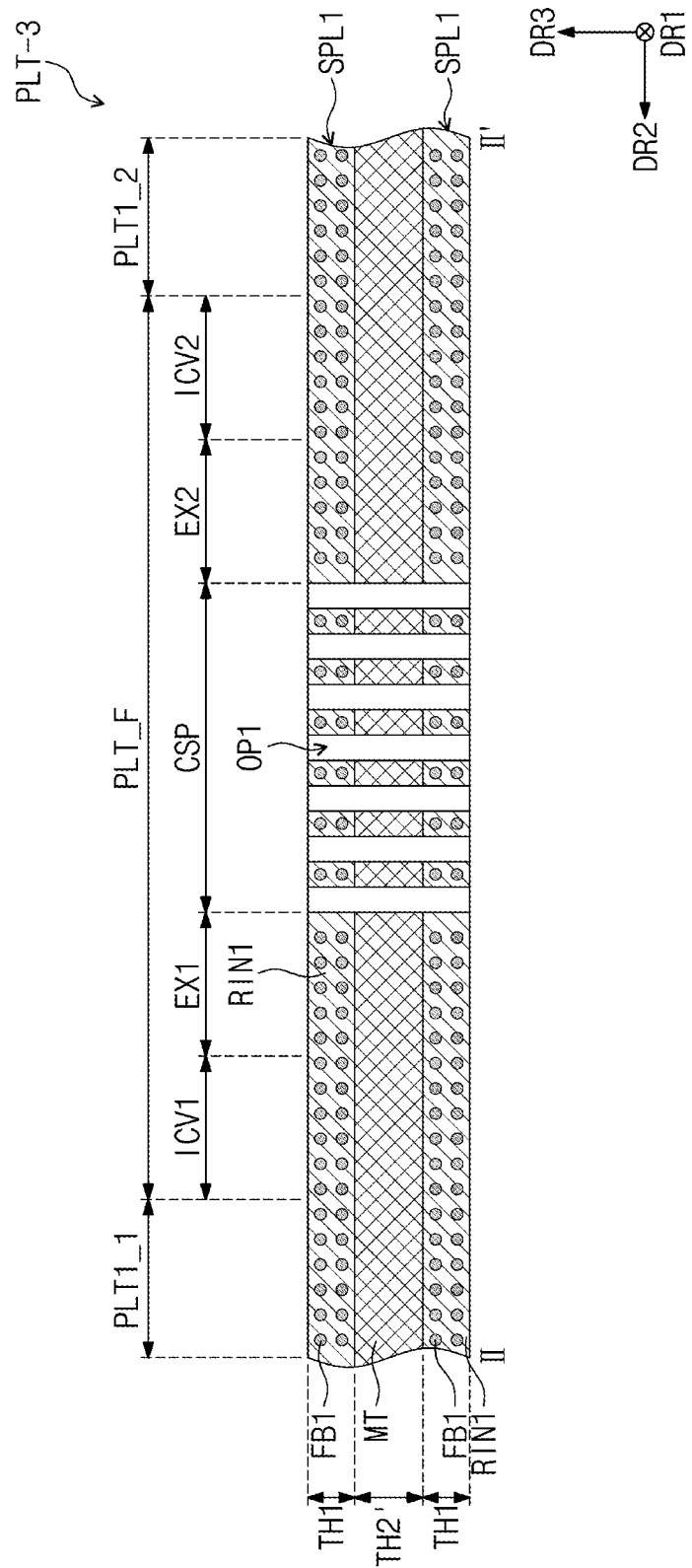
Figure 20:
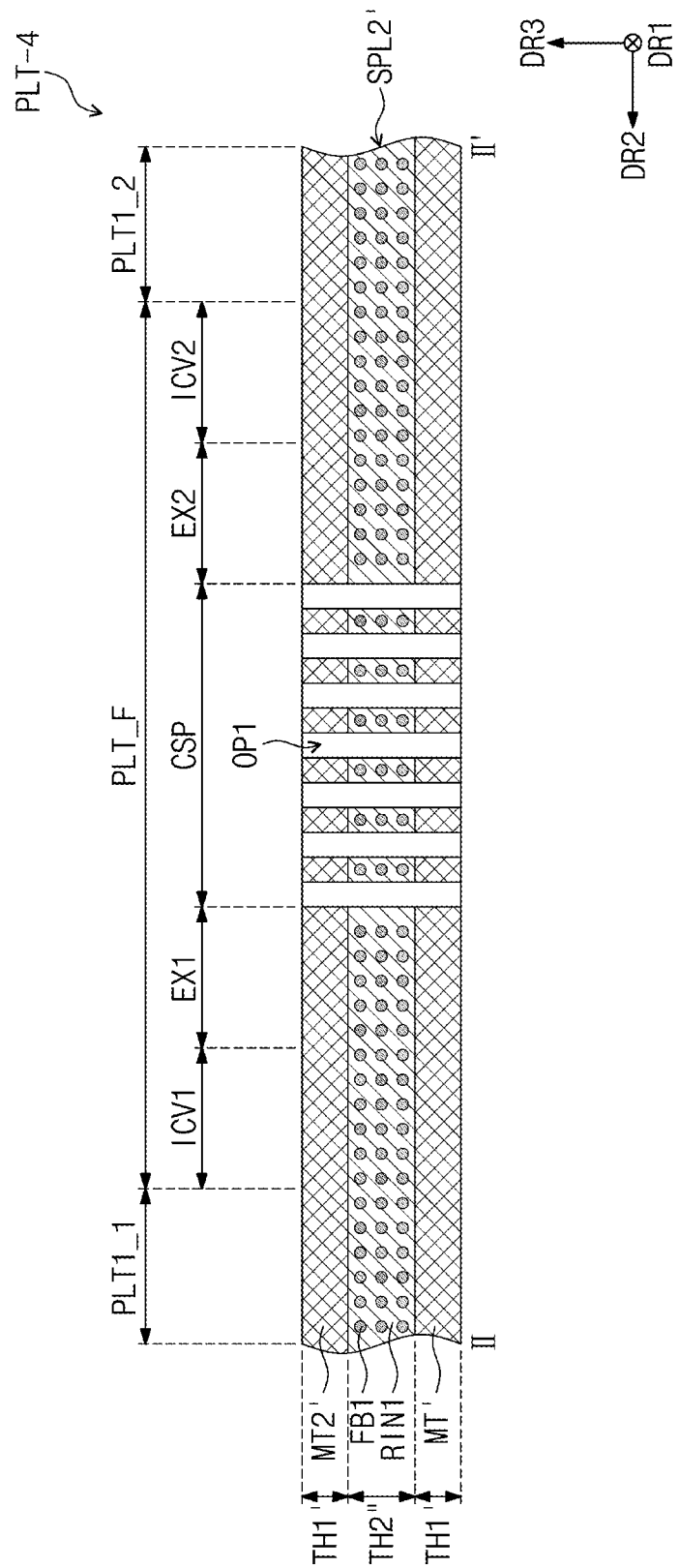

FIGS. 18, 19, and 20 are views of support plates according to embodiments.

As an example, FIGS. 18, 19, and 20 show cross-sections of the support plates corresponding to that of FIG. 14.

Hereinafter, configurations different from those of FIG. 14 will be mainly described in FIGS. 18, 19, and 20 for descriptive convenience.

Referring to FIG. 18, a support plate PLT-2 may include first support layers SPL1 and a second support layer SPL2'. The first and second support layers SPL1 and SPL2' may include first and second resins RIN1 and RIN2 and first and second fibers FB1 and FB2 as the first and second support layers SPL1 and SPL2 of FIG. 14.

The second support layer SPL2' may be disposed between the first support layers SPL1. Each of the first support layers SPL1 may have a thickness TH1 different from a thickness TH2 of the second support layer SPL2' in the third direction DR3. As an example, the thickness TH1 of each of the first support layers SPL1 may be smaller than the thickness TH2 of the second support layer SPL2'.

A first elastic modulus MD1 smaller than a second elastic modulus MD2 may be formed along an extension direction of the first fibers FB1 of the first support layers SPL1. The second support layer SPL2' having the relatively large thickness may support the first support layers SPL1. Since the second support layer SPL2' is thicker than the first support layers SPL1, the second support layer SPL2' may more easily support the first support layers SPL1.

Referring to FIG. 19, a support plate PLT-3 may include first support layers SPL1 and a second support layer MT. The second support layer MT may be disposed between the first support layers SPL1. Each of the first support layers SPL1 may have a thickness TH1 smaller than a thickness TH2' of the second support layer MT in the third direction DR3.

The second support layer MT may include a material different from a material of the first support layers SPL1. As the first support layers SPL1 of FIG. 14, the first support layers SPL1 may include a first resin RIN1 and first fibers FB1. The second support layer MT may include a metal material. The second support layer MT having a relatively large thickness may support the first support layers SPL1.

Referring to FIG. 20, a support plate PLT-4 may include first support layers MT' and a second support layer SPL2'. The second support layer SPL2' may be disposed between the first support layers MT'. Each of the first support layers MT' may have a thickness TH1' smaller than a thickness TH2'' of the second support layer SPL2' in the third direction DR3.

The second support layer SPL2' may include a material different from that of the first support layers MT'. As the first support layers SPL1 of FIG. 14, the second support layer SPL2' may include first fibers FB1 extending in the first direction DR1 and arranged in the second direction DR2. The first support layers MT' may include a metal material. Since the second support layer SPL2' having a relatively large thickness includes the first fibers FB1 extending in the first direction DR1, a first elastic modulus MD1 may be smaller than a second elastic modulus MD2.

Figure 21:
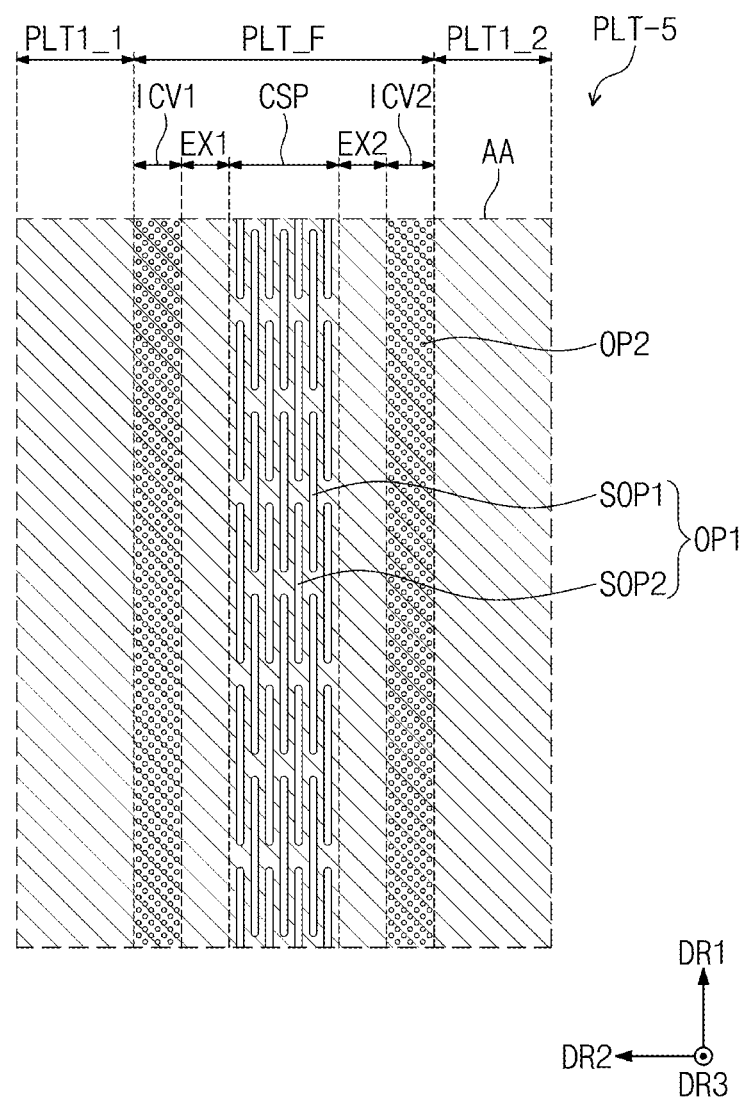
FIG. 21 is a plan view of another embodiment of a support plate.
Figure 22:
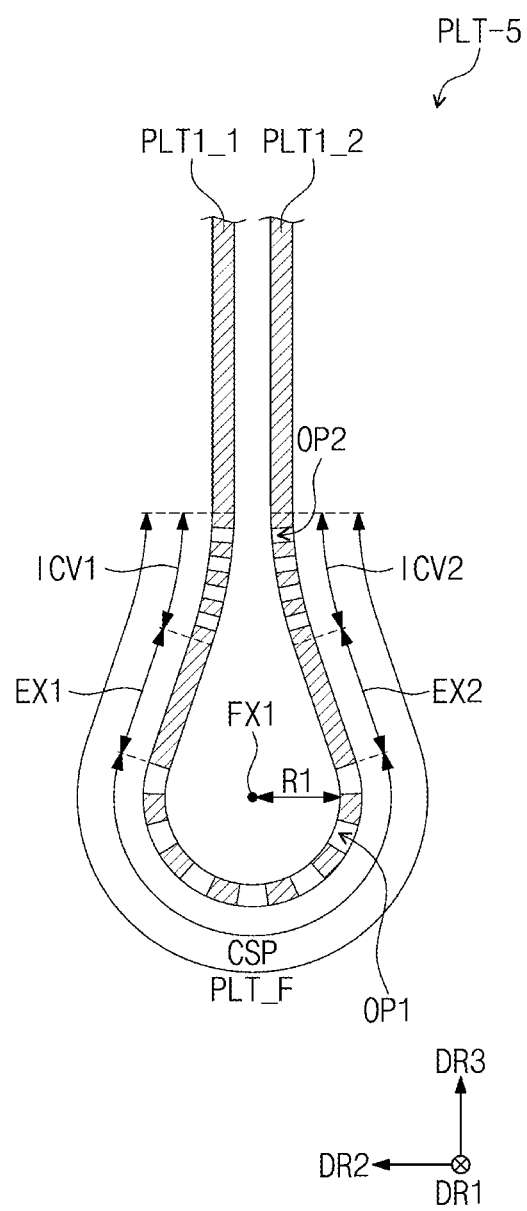
FIG. 22 is a cross-sectional view of a bent state of a support plate of FIG. 21.
Figure 23:
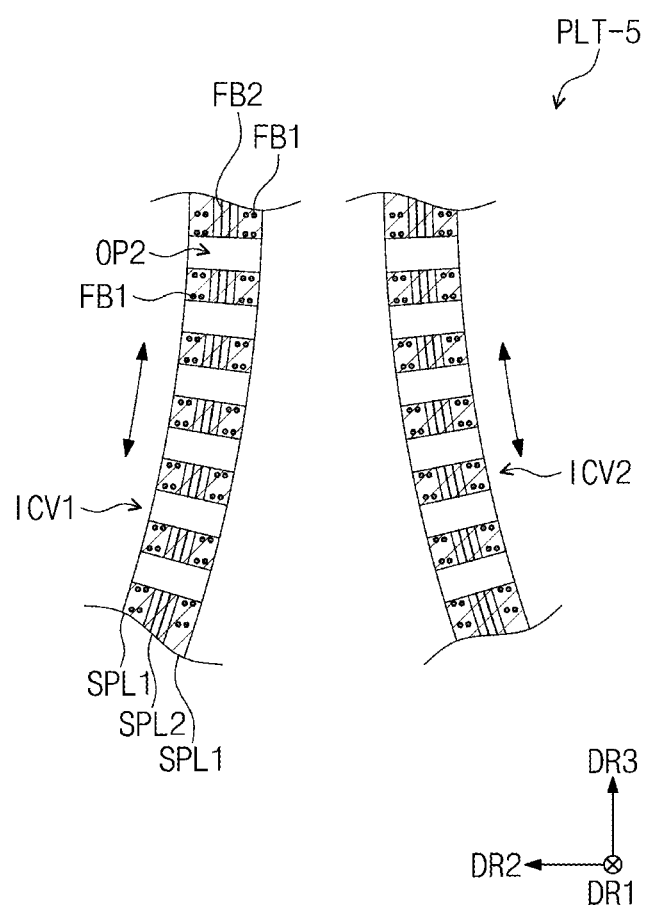
FIG. 23 is an enlarged view of first and second reverse curvature portions of FIG. 22.

FIG. 21 is a view of a support plate PLT-5 according to an embodiment. FIG. 22 is a view of a bent state of the support plate PLT-5 of FIG. 21. FIG. 23 is an enlarged view of first and second reverse curvature portions ICV1 and ICV2 of FIG. 22.

As an example, FIG. 21 is a plan view corresponding to that of FIG. 12, and FIGS. 22 and 23 are cross-sectional views respectively corresponding to those of FIGS. 15 and 16.

Referring to FIGS. 21, 22, and 23, first openings OP1 may be defined through a curved portion CSP of the support plate PLT-5, and a plurality of second openings OP2 may be defined through the first and second reverse curvature portions ICV1 and ICV2 of the support plate PLT-5. The second openings OP2 may be defined through the first and second reverse curvature portions ICV1 and ICV2 in the third direction DR3.

The second openings OP2 may have a circular shape. Each of the second openings OP2 may have a diameter of about 100 micrometers (μm) to about 1 millimeters (mm).

The second openings OP2 may be formed in each of the first and second reverse curvature portions ICV1 and ICV2 at a porosity from about 30% to about 70%. The porosity may indicate a ratio of an area occupied by the second openings OP2 in each of the first and second reverse curvature portions ICV1 and ICV2. As an example, the porosity may be defined as a ratio of the area occupied by the second openings OP2 in each of the first and second reverse curvature portions ICV1 and ICV2 to a total area of each of the first and second reverse curvature portions ICV1 and ICV2.

A folding plate PLT_F may include first support layers SPL1 and a second support layer SPL2 disposed between the first support layers SPL1 as of FIG. 16. The first and second support layers SPL1 and SPL2 of FIG. 23 may have substantially the same structure as that of the first and second support layers SPL1 and SPL2 of FIG. 16.

As described above, as the folding plate PLT_F has a first elastic modulus MD1, the first and second reverse curvature portions ICV1 and ICV2 may be more easily curved or bent. In addition, as the second openings OP2 are defined through the first and second reverse curvature portions ICV1 and ICV2, a flexibility of the first and second reverse curvature portions ICV1 and ICV2 may increase. Accordingly, the first and second reverse curvature portions ICV1 and ICV2 may be more easily curved or bent.

Figure 24:
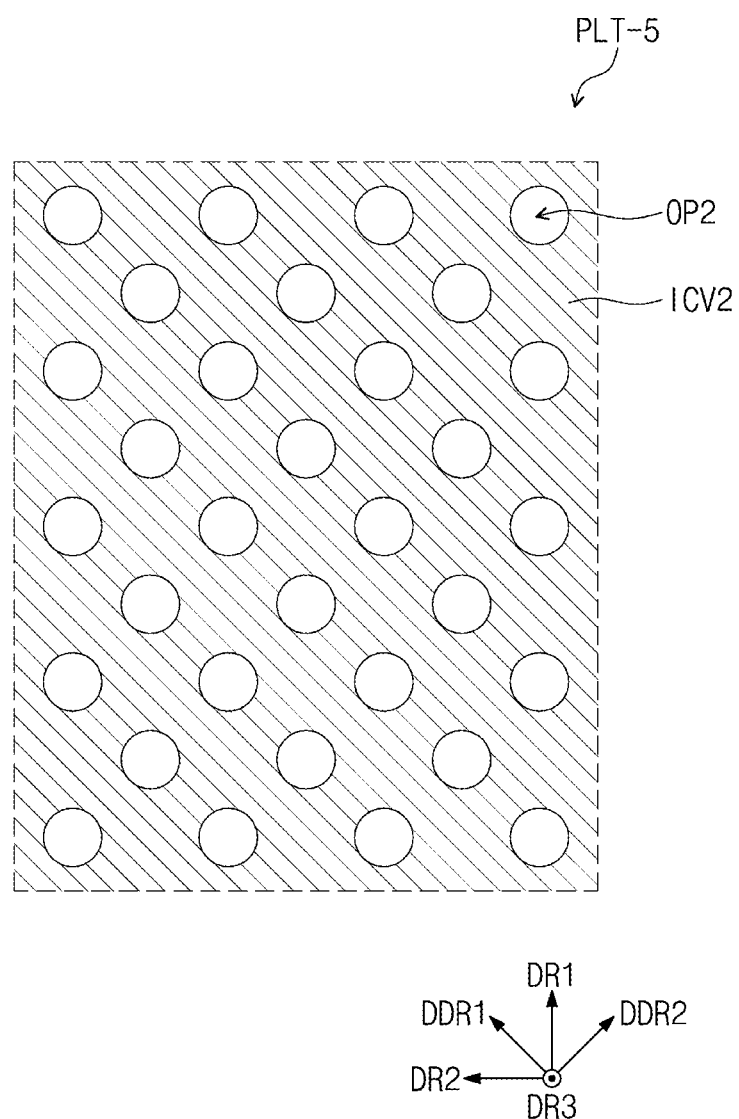
FIG. 24 is an enlarged plan view of a portion of a second reverse curvature portion through which second openings are defined in FIG. 21.

FIG. 24 is an enlarged plan view of a portion of the second reverse curvature portion ICV2 through which second openings are defined in FIG. 21.

Referring to FIG. 24, the second openings OP2 may be uniformly distributed in the second reverse curvature portion ICV2. As an example, the second openings OP2 may be arranged in a first diagonal direction DDR1 and a second diagonal direction DDR2. The second openings OP2 may be arranged in the first diagonal direction DDR1 at regular (or constant) intervals and may be arranged in the second diagonal direction DDR2 at regular (or constant) intervals. For example, the second openings OP2 may be uniformly arranged in the first reverse curvature portion ICV1. For example, the second openings OP2 may be arranged in a regular pattern in the first and second reverse curvature portions ICV1 and ICV2.

Since the second openings OP2 are uniformly distributed in the first and second reverse curvature portions ICV1 and ICV2, a flexibility of the first and second reverse curvature portions ICV1 and ICV2 may increase evenly or uniformly in the first and second reverse curvature portions ICV1 and ICV2.

Figure 25:
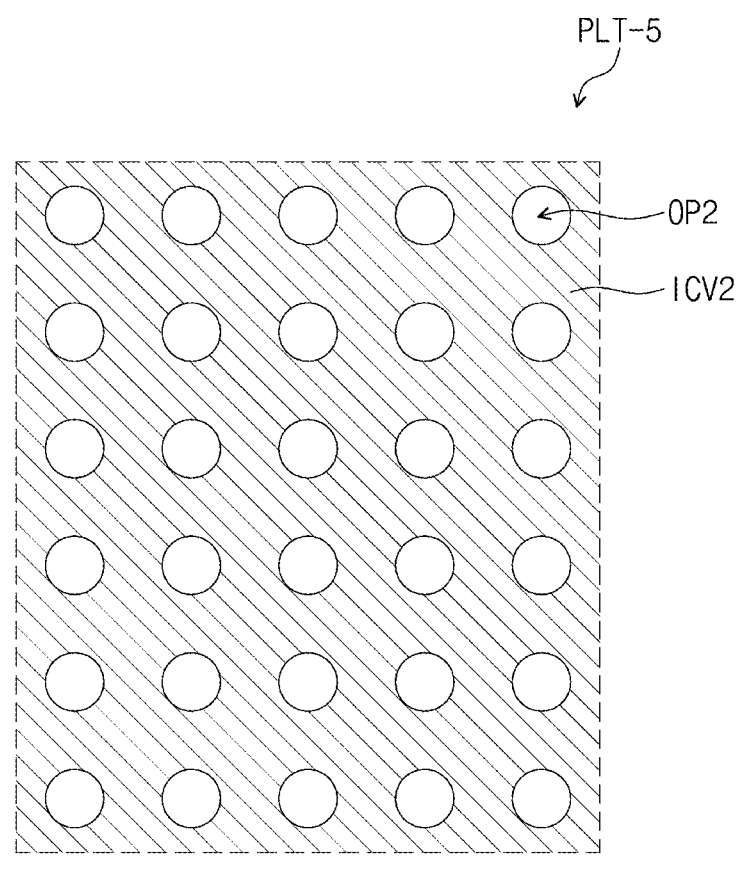
FIGS. 25, 26, and 27 are plan views of various embodiments of second openings.
Figure 26:
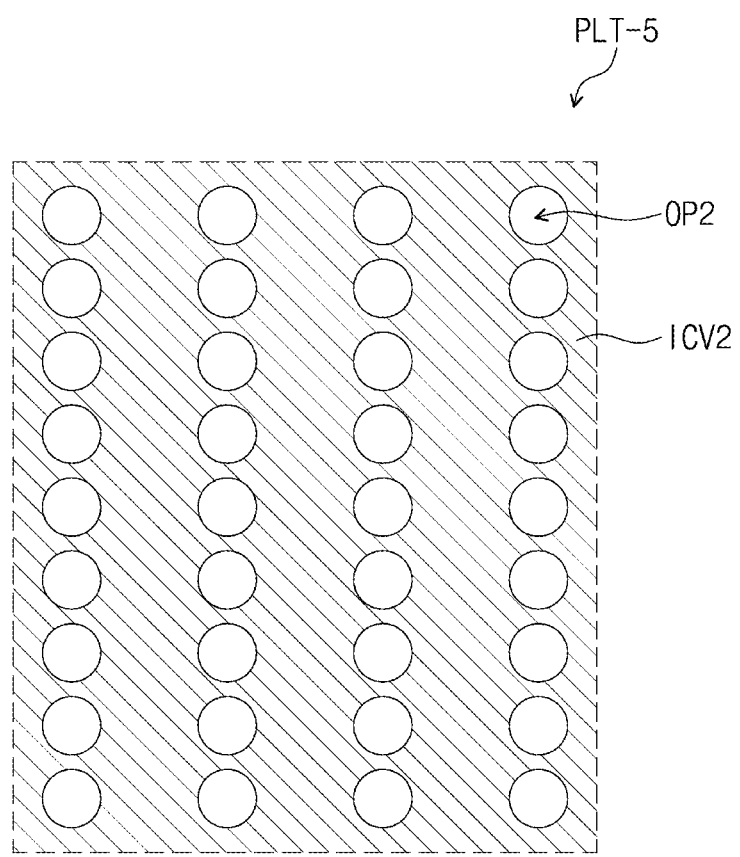
Figure 27:
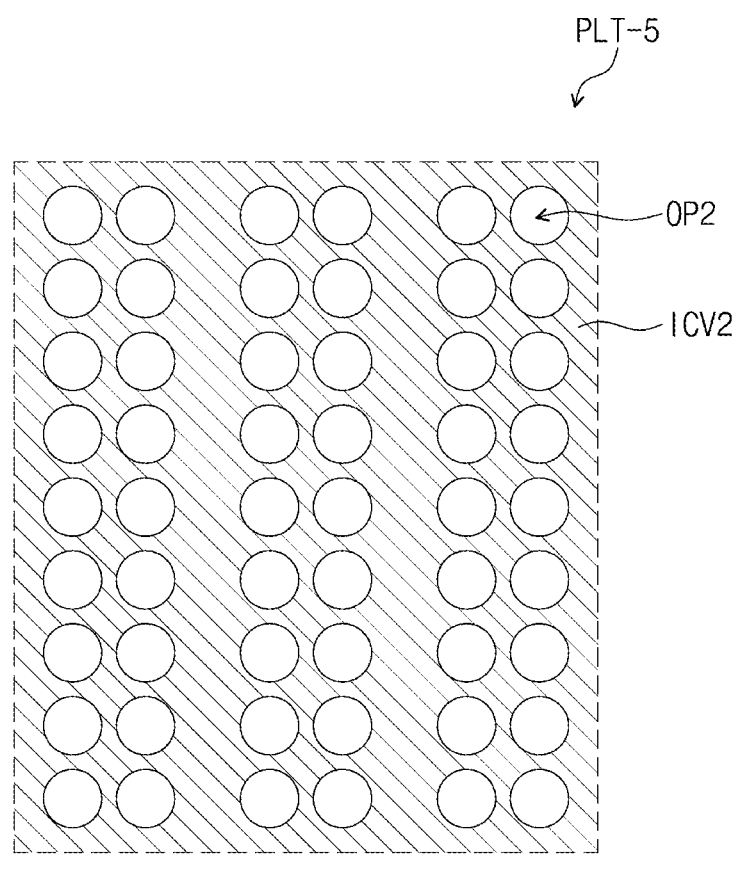

FIGS. 25, 26, and 27 are plan views of various arrangements of second openings OP2 according to embodiments.

As an example, FIGS. 25, 26, and 27 are plan views corresponding to that of FIG. 24, and hereinafter, configurations different from those of FIG. 24 will be mainly described in FIGS. 25 to 27.

Referring to FIG. 25, second openings OP2 may be uniformly arranged in the first direction DR1 and the second direction DR2. The second openings OP2 may be arranged in the first direction DR1 at regular (or constant) intervals and may be arranged in the second direction DR2 at regular (or constant) intervals.

Referring to FIG. 26, second openings OP2 may be arranged in the first direction DR1 and the second direction DR2. The second openings OP2 may be arranged in the first direction DR1 at regular (or constant) intervals and may be arranged in the second direction DR2 at regular (or constant) intervals. The intervals between the second openings OP2 arranged in the first direction DR1 may be smaller than the intervals between the second openings OP2 arranged in the second direction DR2.

Referring to FIG. 27, second openings OP2 may be arranged in the first direction DR1 and the second direction DR2. The second openings OP2 may be arranged in the first direction DR1 at regular (or constant) intervals.

The first direction DR1 may correspond to columns, and the second direction DR2 may correspond to rows. The second openings OP2 may be disposed spaced apart from each other in the units of k columns. The "k" is a natural number equal to or greater than 2. As an example, when k is 2, the second openings OP2 may be disposed adjacent to each other in the units of two columns. A distance between the second openings OP2 arranged in two columns and the second openings OP2 arranged in next two columns may be greater than a distance between the second openings OP2 arranged in two columns. The distance in FIG. 27 may be defined as a distance in the second direction DR2.

Figure 28:
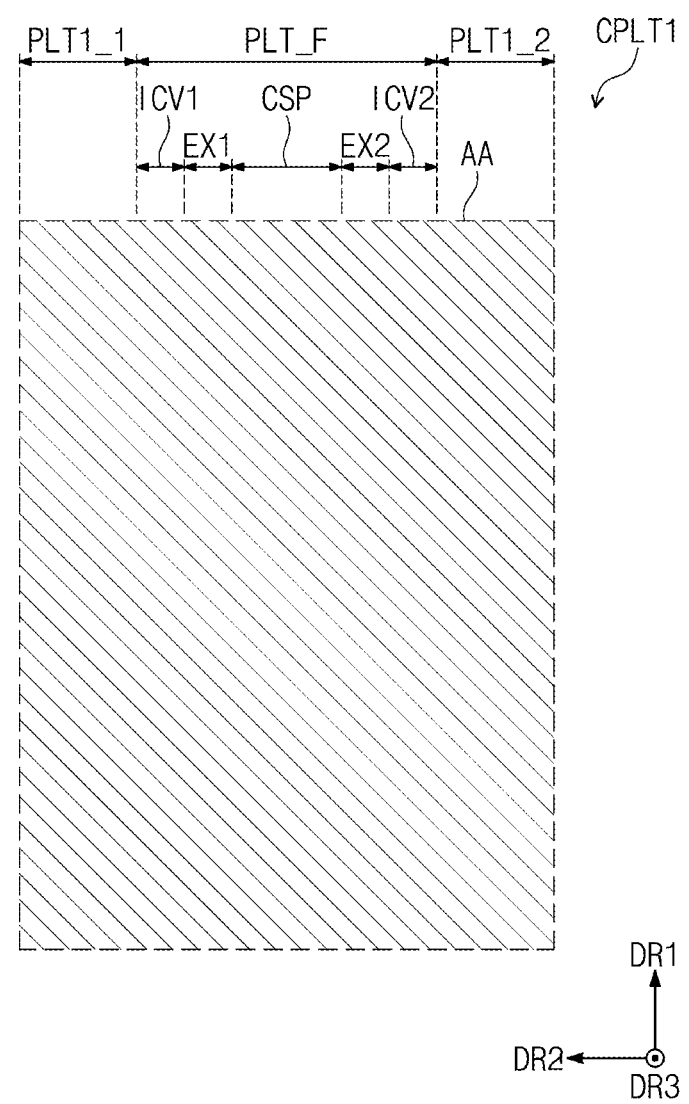
FIGS. 28, 29, and 30 are views of comparison support plates.
Figure 29:
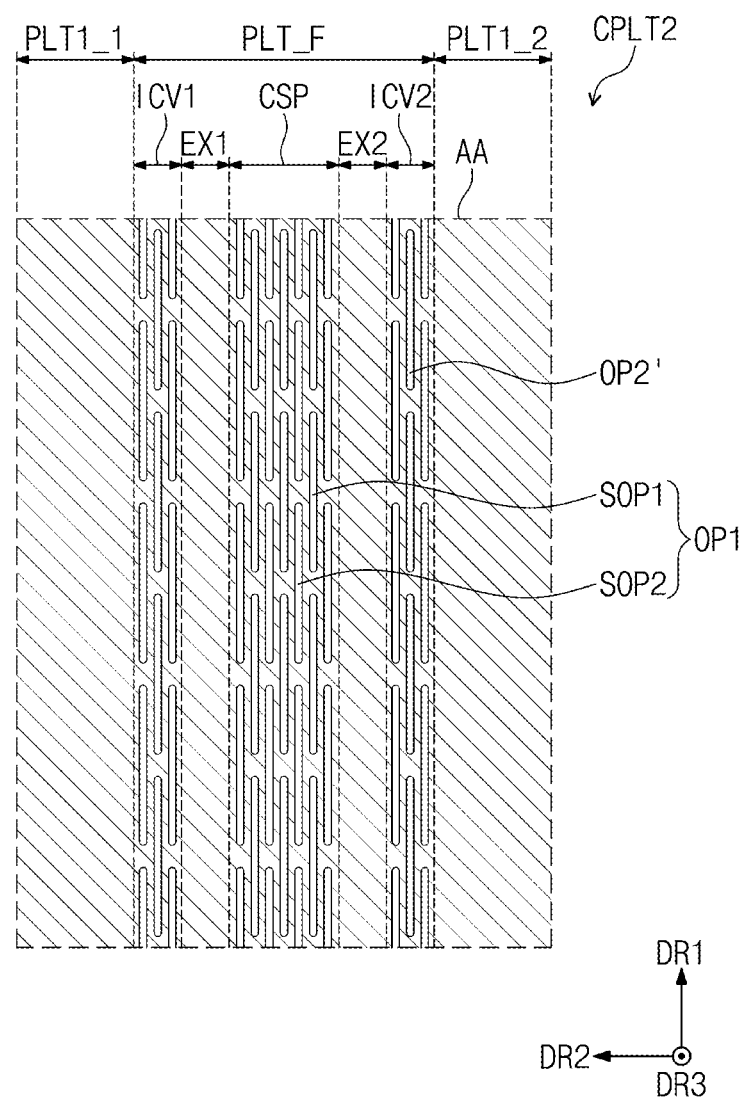
Figure 30:
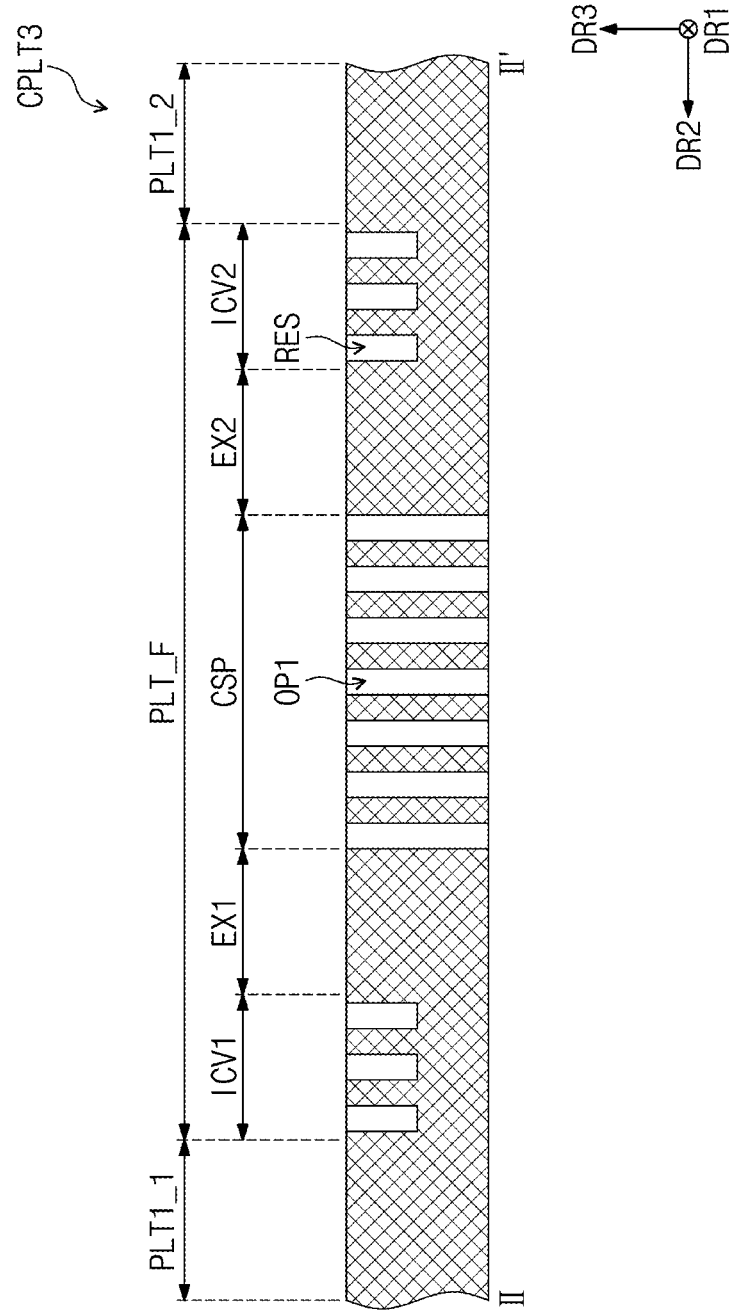

FIGS. 28, 29, and 30 are views of comparison support plates.

As an example, FIGS. 28 and 29 are plan views corresponding to that of FIG. 21, and FIG. 30 is a cross-sectional view corresponding to that of FIG. 14.

Referring to FIG. 28, a comparison support plate CPLT1 may include a curved portion CSP, first and second extension portions EX1 and EX2, and first and second reverse curvature portions ICV1 and ICV2 and may be folded in a dumbbell shape as the support plate PLT-5. The comparison support plate CPLT1 may include a metal material. As an example, the comparison support plate CPLT1 may include a stainless steel (SUS). The first and second openings OP1 and OP2 may not be defined through the comparison support plate CPLT1.

Referring to FIG. 29, a comparison support plate CPLT2 may include a curved portion CSP, first and second extension portions EX1 and EX2, and first and second reverse curvature portions ICV1 and ICV2 and may be folded in the dumbbell shape as the support plate PLT-5.

The comparison support plate CPLT2 may be provided with first and second openings OP1 and OP2' defined therethrough. The first openings OP1 may be formed through the curved portion, and the second openings OP2' may be formed through the first and second reverse curvature portions ICV1 and ICV2. The comparison support plate CPLT2 may include a metal material. As an example, the comparison support plate CPLT2 may include a stainless steel (SUS).

The first openings OP1 defined through the comparison support plate CPLT2 may have the same shape as the first openings OP1 of FIG. 21. Different from the second openings OP2 of FIG. 21, the second openings OP2' of the comparison support plate CPLT2 may not have the circular shape. The second openings OP2' may have substantially the same shape as that of the first openings OP1.

Referring to FIG. 30, a comparison support plate CPLT3 may include a curved portion CSP, first and second extension portions EX1 and EX2, and first and second reverse curvature portions ICV1 and ICV2 and may be folded in the dumbbell shape as the support plate PLT1. The comparison support plate CPLT3 may include a metal material. As an example, the comparison support plate CPLT3 may include stainless steel (SUS) or a titanium alloy (Ti-Alloy).

The comparison support plate CPLT3 may be provided with first openings OP1 and recesses RES defined therein. The first openings OP1 may be defined through the curved portion CSP, and the recesses RES may be defined in the first and second reverse curvature portions ICV1 and ICV2. The recesses RES may be defined in an upper portion of the first and second reverse curvature portions ICV1 and ICV2. The recesses RES may have substantially the same shape as that of the second openings OP2' of FIG. 29 when viewed in a plane. For example, the recesses RES may not pass through the first and second support plates PLT1_1 and PLT1_2.

Table 1 below illustrates test results of the comparison support plates CPLT1, CPLT2, and CPLT3 and the support plates PLT1 and PLT-5 of FIGS. 14 and 21.

TABLE 1

| | Type and material | | | | | |
|---|---|---|---|---|---|---|
| | CPLT1 (SUS) | CPLT2 (SUS) | CPLT3 (SUS) | CPLT3 (Ti-alloy) | PLT1 (CFRP) | PLT-5 (CFRP) |
| Thickness (μm) | 150 | 150 | 150 | 150 | 150 | 150 |
| Shape of opening | FIG. 28 (no opening) | FIG. 29 | FIG. 30 | FIG. 30 | FIG. 14 | FIG. 21 |
| Folding length (L, mm) | 16 | 11.2 | 12.5 | 12.2 | 12.3 | 11.5 |
| Radius of reverse curvature (R2, mm) | 20.0 | 10.0 | 14.0 | 14.5 | 15.0 | 14.0 |
| Buckling risk | 1.0 | 1.6 | 1.4 | 1.3 | 1.1 | 1.2 |
| Visibility of reverse curvature portion | | High | Medium | Medium | Low | Low |

Table 2 below shows test results when the porosity of the support plate PLT-5 of FIG. 21 is set to about 30%, 50%, and 70%. In Table 1, the porosity of the support plate PLT-5 is about 50%.

TABLE 2

| Type, material, and porosity | PLT-5 (CFRP) (30%) | PLT-5 (CFRP) (50%) | PLT-5 (CFRP) (70%) |
|---|---|---|---|
| Thickness (μm) | 150 | 150 | 150 |
| Shape of opening | FIG. 21 | FIG. 21 | FIG. 21 |
| Folding length (L, mm) | 11.8 | 11.5 | 11.2 |
| Radius of reverse curvature (R2, mm) | 14.4 | 14.0 | 13.8 |
| Buckling risk | 1.17 | 1.2 | 1.22 |
| Visibility of reverse curvature portion | Low | Low | Low |

In Tables 1 and 2, the folding length L and the radius of reverse curvature R2 may be defined according to the embodiment described with reference to FIG. 15. The radius of reverse curvature R2 may be the second radius of curvature R2 described with reference to FIG. 15. In Tables 1 and 2, the buckling risk may be an index indicating how much more the first and second reverse curvature portions ICV1 and ICV2 are curved from a normal curved state when the folding tests are repeatedly performed. For example, the term "buckling" means the sudden change in shape (deformation) of a structural component under load.

As the buckling risk increases, the first and second reverse curvature portions ICV1 and ICV2 may be abnormally curved. Accordingly, as the buckling risk decreases, the first and second reverse curvature portions ICV1 and ICV2 may not be curved abnormally, and thus, a damage rate of the display device DD may be reduced. As the folding length L decreases, sizes of the non-folding areas NFA1 and NFA2 may increase.

The visibility of the reverse curvature portion may indicate whether the second openings OP2' in the first and second reverse curvature portions ICV1 and ICV2 of FIGS. 29 and 30 are viewed from the outside. The visibility of the reverse curvature portion may indicate whether the curved state of the first and second reverse curvature portions ICV1 and ICV2 of FIG. 14 is viewed from the outside. The visibility of the reverse curvature portion may indicate whether the second openings OP2 in the first and second reverse curvature portions ICV1 and ICV2 of FIG. 21 are viewed from the outside. The visibility of the reverse curvature portion of the comparison support plate CPLT1 of FIG. 28 is not tested.

In the visibility of the reverse curvature portion, the terms "high" means "visible", "low" means "invisible", and "medium" means "possible to be visible".

Referring to Tables 1 and 2, since the first and second openings OP1, OP2, and OP2' are not defined in the comparison support plate CPLT1, the comparison support plate CPLT1 may have a property of not being easily folded or bent. Accordingly, the buckling risk of the comparison support plate CPLT1 may be low. However, the folding length L of the comparison support plate CPLT1 may be lengthened.

The folding length L of the support plates PLT1 and PLT-5 may be similar to the folding length L of the comparison support plates CPLT2 and CPLT3. However, the buckling risk and the visibility of the reverse curvature portion may be lower in the support plates PLT1 and PLT-5 than that in the comparison support plates CPLT2 and CPLT3.

For example, when the first elastic modulus MD1 of the folding plate PLT_F is smaller than the second elastic modulus MD2 and the second openings OP2 are defined through the first and second reverse curvature portions ICV1 and ICV2, the first and second reverse curvature portions ICV1 and ICV2 may be more easily curved or bent, and the buckling risk and the visibility of the reverse curvature portions may be lowered.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
    a display panel foldable with respect to a folding axis substantially parallel to a first direction; and
    a support plate disposed under the display panel and comprising a folding plate foldable with respect to the folding axis,
    wherein the folding plate comprises at least one first support layer and at least one second support layer, and
    wherein the folding plate has a first modulus corresponding to a bending strength with respect to a second direction intersecting the first direction and a second modulus corresponding to a bending strength with respect to the first direction, the first modulus being smaller than the second modulus.

2. The display device of claim 1, wherein a number of the first support layers is greater than a number of the second support layers.

3. The display device of claim 1, wherein the at least one first support layer is provided in plural, and wherein:
    one of the first support layers forms an upper surface of the support plate facing the display panel,
    another of the first support layers forms a lower surface of the support plate opposite to the upper surface of the support plate, and
    the at least one second support layer is disposed between the first support layers.

4. The display device of claim 3, wherein:
    each of the first support layers comprises a plurality of first fibers extending in the first direction and arranged in the second direction, and
    the second support layer comprises a plurality of second fibers extending in the second direction and arranged in the first direction.

5. The display device of claim 3, wherein each of the first support layers has a same thickness as a thickness of the second support layer with respect to a direction substantially perpendicular to the upper surface of the support plate.

6. The display device of claim 3, wherein each of the first support layers has a thickness different from a thickness of the second support layer with respect to a direction substantially perpendicular to the upper surface of the support plate.

7. The display device of claim 6, wherein the thickness of each of the first support layers is smaller than the thickness of the second support layer.

8. The display device of claim 3, wherein the second support layer comprises a material different from a material of the first support layers.

9. The display device of claim 8, wherein:
    each of the first support layers comprises a plurality of first fibers extending in the first direction and arranged in the second direction, and
    the second support layer comprises a metal material.

10. The display device of claim 8, wherein:
    each of the first support layers comprises a metal material, and
    the second support layer comprises a plurality of first fibers extending in the first direction and arranged in the second direction.

11. The display device of claim 1, wherein:
    the display panel comprises a first non-folding area, a folding area, and a second non-folding area sequentially arranged in the second direction, and
    the support plate further comprises a first support plate disposed in the first non-folding area and a second support plate disposed in the second non-folding area, and
    wherein the folding plate is disposed in the folding area.

12. The display device of claim 11, wherein the folding plate comprises a plurality of first openings, each of the first openings extending in the first direction, wherein the first openings comprise:
a plurality of first sub-openings arranged in the first direction; and
a plurality of second sub-openings adjacent to the first openings in the second direction and arranged in the first direction, and
wherein the first sub-openings are interlaced with the second sub-openings.

13. The display device of claim 12, wherein the folding plate comprises:
a first reverse curvature portion adjacent to the first support plate;
a second reverse curvature portion adjacent to the second support plate; and
a curved portion disposed between the first reverse curvature portion and the second reverse curvature portion and comprising the first openings, and wherein:
the first and second reverse curvature portions are curved in a direction opposite to the curved portion, and
each of the first and second reverse curvature portions comprises a plurality of second openings arranged in a regular pattern.

14. The display device of claim 13, wherein each of the second openings has a circular shape with a diameter from about 100 micrometers to about 1 millimeters.

15. The display device of claim 13, wherein the second openings are formed at a porosity from about 30% to about 70% in each of the first and second reverse curvature portions.

16. A display device comprising:
a display panel foldable with respect to a folding axis substantially parallel to a first direction; and
a support plate disposed under the display panel and comprising a first support plate, a folding plate, and a second support plate arranged in a second direction intersecting the first direction, the folding plate foldable with respect to the folding axis,
wherein the folding plate comprises:
a first reverse curvature portion adjacent to the first support plate;
a second reverse curvature portion adjacent to the second support plate; and
a curved portion disposed between the first and second reverse curvature portions and comprising a plurality of first openings, each of the first openings extending in the first direction, and
wherein each of the first and second reverse curvature portions comprises a plurality of second openings, each of the second openings having a circular shape.

17. The display device of claim 16, wherein the second openings are arranged in a regular pattern in each of the first and second reverse curvature portions.

18. The display device of claim 16, wherein each of the second openings has a diameter from about 100 micrometers to about 1 millimeters and is formed at a porosity from about 30% to about 70% in each of the first and second reverse curvature portions.

19. The display device of claim 16, wherein the folding plate comprises:
a plurality of first support layers each comprising a plurality of first fibers extending in the first direction and arranged in the second direction; and
a second support layer disposed between the first support layers and comprising a plurality of second fibers extending in the second direction and arranged in the first direction.

20. An electronic device comprising:
a display device comprising a first hole area through which an optical signal transmits;
an electro-optical module disposed under the display device, the electro-optical module overlapping the first hole area and receiving the optical signal; and
a case accommodating the display device and the electro-optical module,
wherein the display device comprising:
a display panel foldable with respect to a folding axis substantially parallel to a first direction; and
a support plate disposed under the display panel and comprising a folding plate foldable with respect to the folding axis,
wherein the folding plate comprises at least one first support layer and at least one second support layer, and
wherein the folding plate has a first elastic modulus corresponding to a bending strength with respect to a second direction intersecting the first direction and a second elastic modulus corresponding to a bending strength with respect to the first direction, the first elastic modulus being smaller than the second elastic modulus.

* * * * *